United States Patent [19]

Reid et al.

[11] 4,176,106
[45] Nov. 27, 1979

[54] PHENOL/FORMALDEHYDE RESOLES AND CELLULAR PRODUCTS DERIVED THEREFROM

[75] Inventors: Wallace G. Reid, Katonah, N.Y.; Rakesh Saini, Somerville, N.J.; Kenneth E. Atkins, South Charleston, W. Va.

[73] Assignee: Union Carbide Corporation, New York, N.Y.

[21] Appl. No.: 820,020

[22] Filed: Jul. 28, 1977

[51] Int. Cl.$^2$ ............... C08L 61/08; C08L 61/10
[52] U.S. Cl. ................... 260/29.3; 428/524; 521/181; 528/140; 528/147; 528/165
[58] Field of Search ........... 260/29.3, 2.5 F, 57 C; 521/181

[56] References Cited

U.S. PATENT DOCUMENTS

| | | | |
|---|---|---|---|
| 2,744,875 | 5/1956 | Thomas et al. | 260/2.5 |
| 3,271,331 | 9/1966 | Ender | 260/2.5 |
| 3,298,973 | 1/1967 | Quarles | 260/2.5 |
| 3,673,130 | 6/1972 | Papa et al. | 260/2.5 F |
| 3,876,620 | 4/1975 | Moss | 260/57 R |
| 3,953,645 | 4/1976 | Moss | 428/310 |
| 3,968,300 | 7/1976 | Moss et al. | 428/310 |
| 4,001,148 | 1/1977 | Simic et al. | 260/2.5 F |
| 4,033,909 | 7/1977 | Papa | 260/2.5 F |
| 4,033,910 | 7/1977 | Papa | 260/2.5 F |
| 4,070,313 | 1/1978 | Papa | 260/2.5 F |

*Primary Examiner*—Theodore E. Pertilla
*Attorney, Agent, or Firm*—Marylin Klosty

[57] ABSTRACT

The present invention provides particular phenol/formaldehyde resoles which are especially useful as foamable resins, and further provides cellular phenolic products having physical properties which are especially attractive for end-use application as construction foam. The resoles are characterized by a particular relationship between their viscosity and water content, expressed as the area bounded by certain points on a plot of resole viscosity on a logarithmic scale, as a function of water content of the resole, the particular area depending upon the mole ratio of formaldehyde-to-phenol at which the resole has been condensed. It has been found that phenol-formaldehyde resoles having the defined viscosity/water relationship are capable of providing phenolic foam having acceptable foam processability, a foam density from about 1.90 to about 3.70 pounds per cubic foot and, within this foam density range, a good balance of friability resistance and compressive strength, that is, a friability of less than 35 percent weight loss and a compressive strength of at least 20 pounds per square inch. Preferred resoles within the invention are foamable to phenolic foam having a reduced tendency to punk as well as the aforementioned desirable combination of foam processability and mechanical properties.

13 Claims, 3 Drawing Figures

LOG VISCOSITY OF RESOLE AS A FUNCTION OF WATER CONTENT. FORMALDEHYDE:PHENOL MOLE RATIO= 2.1 : 1

LOG VISCOSITY OF RESOLE AS A FUNCTION OF WATER CONTENT.
FORMALDEHYDE: PHENOL MOLE RATIO = 1.75:1

PHENOL/FORMALDEHYDE RESOLES AND CELLULAR PRODUCTS DERIVED THEREFROM

FIELD OF THE INVENTION

The present invention relates to particular base-catalyzed condensation products of phenol and formaldehyde, which are especially useful in producing phenolic foam having a good combination of properties. The invention also pertains to phenolic foam of acceptable overall quality and which additionally exhibits a good balance of friability resistance and compressive strength within a specified density range.

BACKGROUND OF THE INVENTION

Well known to the art is the base-catalyzed condensation of phenol and formaldehyde to produce liquid condensates, commonly referred to as "resoles". Curing of resoles to higher molecular weight, cross-linked thermoset resins proceeds with generation of heat and is accelerated by acid materials. In the presence of strongly acidic accelerators of the exothermic curing reaction and a source of blowing action, resoles cure rapidly to cellular phenolic resins.

Relative to cellular polyurethanes, phenolic foam possesses better inherent resistance to burn with an open flame and emits very low levels of smoke on heating. Notwithstanding these highly desirable characteristics, phenolic foam in general has been used in commercial practice primarily for general packaging purposes and to embed floral arrangements. For more widespread industrial application such as for wall and pipe insulation, roofing insulation and other construction purposes, it is desirable to provide phenolic foam having an acceptable combination of mechanical properties such as low friability and high compressive strength within a specified density range.

In addition to the high friability and low compressive strength generally associated with phenolic foam derived from conventional phenol/formaldehyde resoles, also to be reckoned with is the ability of phenolic foam to undergo flameless combustion when heated to its decomposition temperature. This phenomenon is commonly referred to as "punking" and may be likened to the glowing of charcoal briquettes. Punking of phenolic foam can be initiated at temperatures as low as 500° C. or even lower. Once started, the hazardous punking or after-glow state is self-sustaining and sometimes foam temperatures as high as 1700° C. are reached.

One approach to improvement of the mechanical properties and punking behavior of phenolic foam is the addition of special ingredients to the foam formulation such as particular blowing agents, surfactants and fillers. For example, the formation of non-punking foam is reported in U.S. Pat. No. 3,298,973 by the employment of a particular catalyst mixture of at least two acidic agents. The catalyst is a solid mixture of boric acid, or its anhydride, and an organic hydroxy acid in which the hydroxy group is on a carbon atom not more than one carbon atom removed from a carboxyl group such as, for example, oxalic acid. Punking of phenolic foam is also inhibited by the incorporation of certain organophosphorous compounds such as those described in U.S. Pat. No. 3,673,130.

Improvement in the punking resistance of phenolic foam by the use of a particular class of aralkyl-substituted polysiloxane oils is described in copending patent application Ser. No. 649,815, filed Jan. 16, 1976, in the name of Anthony J. Papa, now U.S. Pat. No. 4,070,313, granted Jan. 24, 1978. It was also found that the friability resistance of the phenolic foam could be improved by the use of the aralkyl-substituted polysiloxane oils in combination with polysiloxane-polyoxyalkylene copolymers of the type described in U.S. Pat. No. 3,271,331. However, as further described in the aforementioned patent, the improvement in friability was achieved at some sacrifice of the punking resistance otherwise achieved when the aralkyl-substituted siloxane oil is used as the sole surfactant component of the foam formulation.

Another approach to improving the mechanical properties of phenolic foam is to modify the resole during its preparation by the use of a combination of phenolic compounds. For example, in U.S. Pat. No. 3,639,303, it is reported that phenolic foam of improved toughness and abrasion resistance is realized when the resole is produced by the reaction of formaldehyde with a mixture of a mononuclear phenol and a polynuclear diphenol such as a mixture of phenol itself and a bis(p-hydroxybenzyl) diphenyl ether. Further, in U.S. Pat. No. 3,876,620 and a division thereof, U.S. Pat. No. 3,953,645, the formation of phenolic polymers by a sequential two-step polymerization process is described. In the first step, ortho-cresol and formaldehyde are reacted to provide an intermediate polymer which is then reacted in a second step with phenol and additional formaldehyde. Relative to foam derived from polymers produced with phenol and formaldehyde only, the patentee reports that foam derived from the ortho-cresol/-phenol/formaldehyde polymers prepared in accordance with his claimed method, is of low friability. Indeed, in Table III at columns 13–14 of U.S. Pat. No. 3,876,620, the patentee reports that foaming of phenolic polymers produced by the claimed sequential two-step method, provided foam which exhibited only an 8 percent weight loss (ASTM C-421, 10 minute friability test), whereas the weight loss of foam derived from phenol/formaldehyde polymers which did not contain the presence of the difunctional ortho-cresol, provided "an undesirably high friability of 55%" (column 14, lines 26–29), as summarized below:

| U.S. Pat. No. 3,876,620 | | |
|---|---|---|
| Foam Example | 21 | 27 |
| Phenolic polymer from Example No. | 1 | 18 |
| Mole ratio of o-cresol/phenol in polymer | 1/1 | 0/1 |
| Foam density, pcf. | 1.7 | 1.6 |
| Friability, 10 minute weight loss, % | 8 | 55 |

Although the patentee has provided a method for achieving phenolic foam of improved friability resistance, the method depends upon a two-step polymerization in forming the phenolic polymer and the use of ortho-cresol as an additional reactant which adds to the cost of polymer manufacture.

The aforementioned U.S. Pat. No. 3,876,620, filed Apr. 26, 1973, is also of interest from the standpoint of the following summary of the prior art set forth therein at column 1, lines 12–23:

"A number of the cellular materials described in these [i.e., the references noted at column 1, lines 6–12] and in other patents exhibit advantageous properties of compressive strength, self-extinguishing character, and low thermal conductivity. However, known cellular materials produced from phenolic polymers exhibit an undesirably high friability. This undesirably high friability is accompanied by increased dustiness and low tensile strength. In fact, this undesirably high friability has practically precluded the use of phenolic polymers as structural laminates such as wallboard. See also Modern Plastics Encyclopedia, Volume 41, pages 362–363 (1964)."

Moreover, although the teachings of U.S. Pat. No. 3,876,620 are directed towards providing phenolic foam of improved friability resistance, the patentee does not define other physical property measurements such as compressive strength and punking behavior, nor does the patentee deal with foam processability or overall foam quality such as the presence of blow holes or voids.

A third approach to improvement of the properties of phenolic foam is, of course, one which combines modification of the phenolic polymer during its preparation, with the use of special ingredients in the foam formulation. This approach is illustrated by U.S. Pat. No. 3,968,300 which emphasizes the use of ortho-cresol in the preparation of the phenolic polymer to be foamed and employs the use of a particular mixture of trichlorofluoromethane and 1,1,2-trichloro-1,2,2-trifluoroethane to give a foam having a lower thermal conductivity (k factor) than a foam produced with either blowing agent alone.

By way of observation it is noted that, even though the illustrative low k factor foams of U.S. Pat. No. 3,968,300 are based on ortho-cresol/phenol/formaldehyde polymers produced by the two-step sequential method of U.S. Pat. No. 3,876,620, the reported values for friability of the low k factor foams are higher than those reported in the U.S. Pat. No. 3,876,620. This observation is noted by way of further illustrating the difficulty of optimizing a particular property of phenolic foam by special additives to the foam formulation without adversely affecting another property.

The complexities involved in seeking to improve overall phenolic foam properties by the use of special formulation ingredients, is also apparent from the teachings of U.S. Pat. No. 4,033,910. The latter patent deals with the use of particular mixtures of methyl formate and 1,1,2-trichloro-1,2,2-trifluoroethane as a blowing agent in the formation of phenolic foam and with the different effects of such mixtures on foam cell size and friability. The nature of these effects, as explained in the patent, depends on whether in the preparation of the resole, the aqueous alkaline condensate has been treated by the addition thereto of neutralizing acidic compounds (e.g., sulfuric acid) thereby forming salts, or whether the condensate has been subjected to treatment with cation and anion exchange resins to provide resoles free of ionic species in accordance with the particular method described in U.S. Pat. No. 4,033,909.

In view of the above, it is believed evident that the state of the art is such to indicate that, unless an additional reactant such as ortho-cresol is used in the preparation of the phenolic polymer to be foamed or, unless special ingredients are added to the foam formulation, it is difficult to obtain from phenol/formaldehyde resoles, phenolic foam having a good balance of properties, such as, in particular, low friability and high compressive strength at an economic foam density, or foam having these desirable mechanical properties as well as a reduced tendency to punk.

It should also be appreciated that, in addition to improving the mechanical properties and punking behavior of phenolic foam derived from phenol/formaldehyde resoles, it is also important that the resole have adequate reactivity to provide foam within an economic density range and yet, the resole must not be too reactive. If the resole is too reactive, the exotherm during subsequent foaming is difficult to control and thus low density foam plagued with blow holes is obtained, that is, foam processability is unacceptable.

Compounding the complexities of phenolic foam technology is the difficulty of reproducibly manufacturing foamable phenol/formaldehyde resins with reasonable assurance that a particular desired combination of foam properties will be obtained upon foaming. This difficulty may be attributable to the well-recognized complex nature of phenol/formaldehyde resoles. Although the exact nature thereof has not been elucidated, it is generally recognized that phenol/formaldehyde resoles contain varying amounts of mono-, di- and trimethylolated mononuclear phenols (phenol alcohols) as well as polymethylolated polynuclear phenols. Precise characterization of the distribution of such molecular species or oligomers is further hampered by the usual presence in the resole of water and varying amounts of free phenol and formaldehyde.

It is, therefore, a primary object of this invention to provide a particular class of phenolic polymers, or resoles, derived from phenol and formaldehyde as the sole reactants added to the condensation reaction, which resoles are foamable to cellular products having a good balance of mechanical properties such as relatively low friability and high compressive strength within an economic density range, as well as acceptable processability from the standpoint of being free of deleterious defects such as an excessive number of voids, and severe stress cracks.

A more particular object is to provide phenol/formaldehyde resoles which are foamable to cellular products having a density from about 1.90 to about 3.70 pounds per cubic foot and which, within this density range, have a friability resistance of less than 35 percent weight loss (10 minute test), a compressive strength of at least 20 pounds per square inch, and acceptable processability.

Another object is to provide phenol/formaldehyde resoles which are characterized in a manner which allows for their manufacture on a reproducible basis from the standpoint of consistent performance as resins foamable to cellular products having the aforesaid desirable combination of mechanical properties and acceptable processability.

Another object is to provide phenol/formaldehyde resoles which are foamable to cellular phenolic products having the aforesaid characteristics and which, in addition, exhibit a reduced tendency to punk.

A further object is to provide cellular phenolic products having a density from about 1.90 to about 3.70 pounds per cubic foot and which, within this density range, have a friability resistance of less than 35 percent weight loss (10 test), a compressive strength of at least 20 pounds per square inch, and acceptable processability.

A still further object is to provide cellular phenolic products having the aforesaid characteristics and which, in addition, exhibit improved punking resistance.

Various other objects and advantages of the present invention will become apparent from the accompanying description and disclosure.

SUMMARY OF THE INVENTION

The present invention is predicated on a number of discoveries the cumulative effect of which has resulted in the ability to define and reproducibly provide, normally liquid phenolic resoles derived from phenol and formaldehyde as the sole reactants fed to the base-catalyzed reaction thereof, which resoles are inherently capable of being foamed to cellular phenolic products having acceptable processability and a good combination of friability resistance and compressive strength within an economic density range from about 1.90 to about 3.70 pounds per cubic foot.

One such discovery is that certain properties of phenolic foam derived from phenol/formaldehyde resoles such as density, friability resistance and compressive strength, are a function of the extent of advancement or the average molecular weight of the phenol/formaldehyde resole to be foamed.

A further discovery is that phenol/formaldehyde resoles which do provide phenolic foam having a good combination of processability and mechanical properties on a substantially consistent basis, are definable as those resoles which have a particular relationship between resole viscosity and water content which relationship, in turn, is dependent upon the formaldehyde-to-phenol mole ratio at which these two reactants are initially condensed. This particular relationship was ultimately defined by plotting the viscosity of the resoles on a logarithmic scale as a function of water content and relating the resulting plot to performance of the resole as a foamable resin.

Related to the above is the recognition that the relationship between resole viscosity and water content reflects the extent of advancement of the phenol and formaldehyde, that is, the average molecular weight of the resole which per se is not readily definable by analytical techniques.

More particularly, the present invention provides phenol/formaldehyde resoles which have been produced by the base-catalyzed condensation of phenol and formaldehyde as the sole reactants fed to the condensation reaction, at a formaldehyde-to-phenol mole ratio of from about 1.6 to about 2.2 moles of formaldehyde per mole of phenol, the aqueous alkaline condensate having been neutralized by the addition thereto of an acidic compound, which resoles are characterized by a viscosity/water relationship such that a plot of viscosity (Brookfield at 25° C.) on a logarithmic scale as a function of water content falls within the area defined by particular boundaries set out below under (a)–(c), which boundaries depend on the mole ratio at which the phenol and formaldehyde are fed to the condensation reaction.

(a) When the mole ratio at which phenol and formaldehyde are fed to the base-catalyzed reaction is at least 1.9 and no more than about 2.2 moles of formaldehyde per mole of phenol, the resoles of the invention are those having a viscosity/water relationship which falls within the area defined by straight line interconnection in series of points (i) to (iv) on a graphically depicted plot of log viscosity of the resole as a function of water content of the resole, where points (i)–(iv) are:

(i) a viscosity of about 50,000 centipoise at a water content of about 1.7 weight percent;
(ii) a viscosity of about 50,000 centipoise at a water content of about 9.5 weight percent;
(iii) a viscosity of about 12,000 centipoise at a water content of about 15.0 weight percent; and
(iv) a viscosity of about 1,000 centipoise at a water content of about 15.0 weight percent.

(b) When the mole ratio at which phenol and formaldehyde are fed to the base-catalyzed reaction is at least 1.7 and less than 1.9 moles of formaldehyde per mole of phenol, the resoles of the invention are those having a viscosity/water relationship which falls within the area defined by straight line interconnection in series of points (i) to (iv) on a graphically depicted plot of log viscosity as a function of water content, where points (i)–(iv) are:

(i) a viscosity of about 50,000 centipoise at a water content of about 3.0 weight percent;
(ii) a viscosity of about 50,000 centipoise at a water content of about 14.0 weight percent;
(iii) a viscosity of about 25,000 centipoise at a water content of about 16.0 weight percent; and
(iv) a viscosity of about 1,000 centipoise at a water content of about 16.0 weight percent.

(c) When the mole ratio at which phenol and formaldehyde are fed to the base-catalyzed reaction is at least about 1.6 and less than 1.7 moles of formaldehyde per mole of phenol, the resoles of the invention are those having a viscosity/water relationship which falls within the area defined by straight line interconnection in series of points (i) to (iv) on a graphically depicted plot of log viscosity of the resole as a function of the water content of the resole, where points (i) to (iv) are:

(i) a viscosity of about 50,000 centipoise at a water content of about 6.5 weight percent;
(ii) a viscosity of about 50,000 centipoise at a water content of about 12.5 weight percent;
(iii) a viscosity of about 25,000 centipoise at a water content of about 16.0 weight percent; and
(iv) a viscosity of about 3,000 centipoise at a water content of about 16.0 weight percent.

Geometrically, the above-defined areas are of a trapezoidal configuration and are bounded by the four interconnected solid lines shown on the graphs of FIGS. 1, 2 and 3 of the accompanying drawings.

Figure 1:
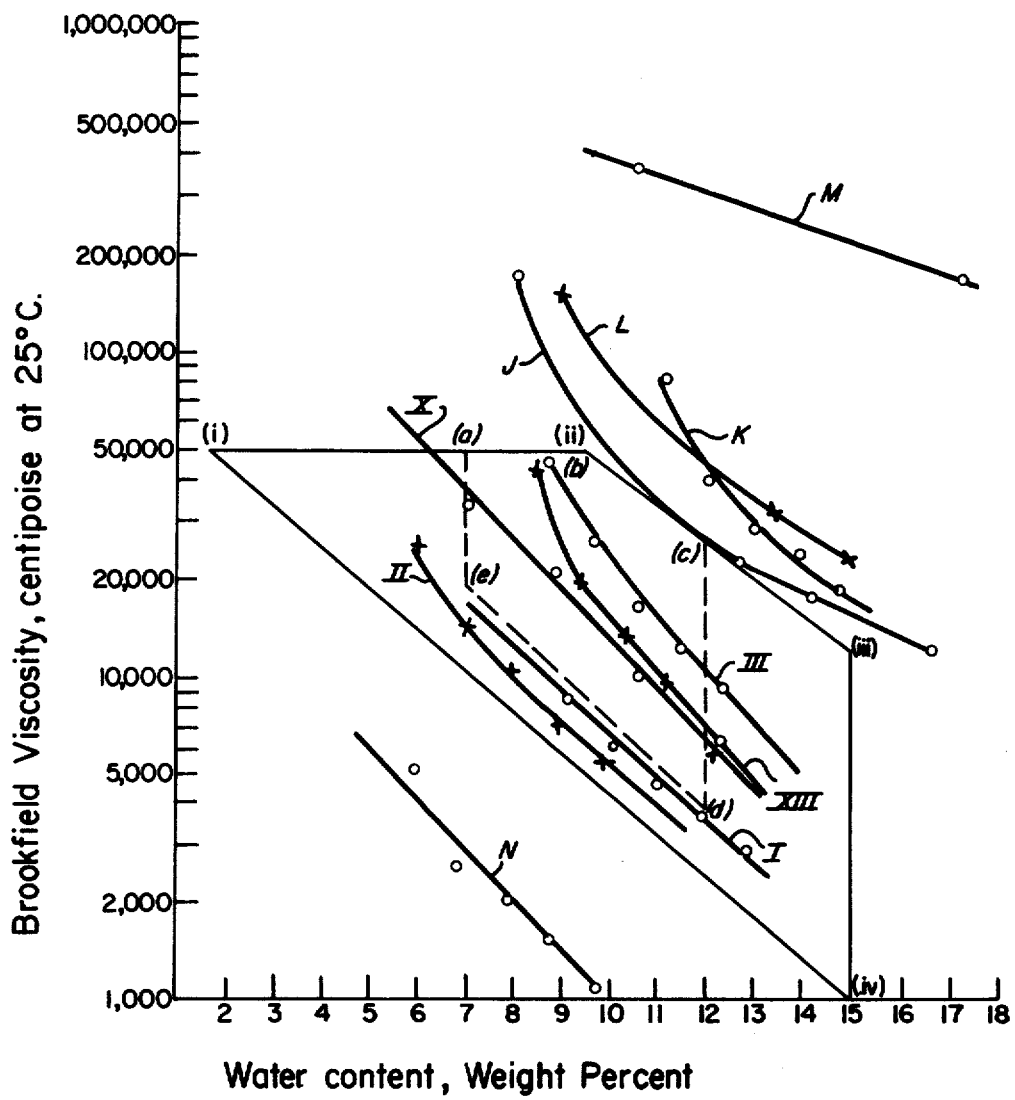
FIG. 1 is a graph on a logarithmic scale of resole viscosity as a function of water content where the particular resoles had been condensed at a formaldehyde-to-phenol mole ratio of about 2.1 using sodium hydroxide as the condensation catalyst.

It has been found that resoles which have a log viscosity/water relationship which falls within the above-defined areas are foamable to cellular products which, in general, exhibit a good balance of friability resistance and compressive strength within a density range from about 1.90 to about 3.70 pounds per cubic foot. More particularly, the resoles of the invention are foamable to cellular products having, within the stated density range, a friability of less than about 35 percent weight loss (after the 10 minute tumbling test of ASTM C-421) including a friability of less than about 25 percent weight loss, and a compressive strength of at least about 20 pounds per square inch (parallel measurement, ASTM D-1621) including compressive strengths greater than 25 pounds per square inch. The resoles of the invention also possess the further important characteristic of good processability from the standpoint of a workable viscosity and ability to provide foams having a minimum of deleterious defects such as excessive voids and severe stress cracks. Further, resoles of the invention are also formable to cellular phenolic products having the aforementioned properties as well as low thermal conductivity, that is, a k factor within the range from about 0.20 to about 0.30 B.T.U. inches/hour ft.$^2$ °F.

In view of their performance as foamable resins and the desirable combination of mechanical properties of foam derived therefrom, the phenol/formaldehyde resoles of the invention are especially useful in forming construction foam for end-use applications such as wall and pipe insulation and roof-decking. As discussed in greater detail hereinafter, it has been further found that preferred resoles within the invention are also foamable to cellular products which, at least as formed and tested on a bench scale, exhibit a reduced tendency to punk when subjected to the particular punking test hereinafter described.

The viscosity/water relationship described herein advances the art of foamable phenol/formaldehyde resoles in that it is a means of reflecting the extent of advancement or average molecular weight of the resole which is necessary to achieve a predetermined foam performance. By providing the viscosity/water relationship as a "fingerprint" of the average molecular weight of a given resole, it is also feasible to provide phenol/formaldehyde resoles reproducibly from the standpoint of foam performance. Thus, in accordance with another aspect of the present invention, improvement is provided in a process for producing phenol/formaldehyde resoles by condensing these two compounds as the sole organic reactants fed to the base-catalyzed condensation reaction; in which process the aqueous alkaline condensate is neutralized by the addition thereto of an acidic compound, which improvement comprises effecting the condensation reaction at a formaldehyde-to-phenol ratio from about 1.6 to about 2.2 of formaldehyde per mole of phenol and effecting the condensation under reaction conditions such that a plot of resole viscosity on a logarithmic scale as a function of resole water content, falls within the respective areas defined by above specified points (i) to (iv) for the indicated formaldehyde-to-phenol mole ratios.

It is to be understood that, although the viscosity and water content of any given resole as initially prepared may not actually be within the areas bounded by straight line interconnection in series of respective points (i) to (iv), the extent of advancement of the resole or its average molecular weight, may nevertheless have reached the desired stage or end-point. Whether the desired extent of advancement has in fact been achieved is readily determined simply by diluting with water those resoles having a viscosity above the defined area, or by separating water from those resoles having a viscosity below the defined area, and measuring the viscosity of the resulting diluted or concentrated resole. If upon such adjustment of water content, a plot of log viscosity against water content now falls within (that is, extends into) the defined areas, the phenol/formaldehyde resole is of the invention in that its viscosity/water relationship was capable of falling within the defined areas, thereby indicating that the resole, as initially prepared, had in fact already reached the desired average molecular weight.

The present invention also relates to phenolic foam produced by foaming the resoles of the invention in the presence of an acidic catalyst and a source of blowing action. Usually the reaction mixture or foam formulation also contains a surface active agent.

DETAILED DESCRIPTION OF THE INVENTION AND PREFERRED EMBODIMENTS

(A) Preparation of Resoles

The phenol/formaldehyde resoles of the present invention are produced by effecting the condensation of phenol and formaldehyde at a mole ratio of formaldehyde-to-phenol from about 1.6 to about 2.2 moles of formaldehyde per mole of phenol fed to the condensation reaction zone. For brevity, the mole ratio of formaldehyde-to-phenol is also referred to herein simply as the "F/P ratio". Inasmuch as phenol is trifunctional in its reaction with formaldehyde, that is, phenol can be methylolated with formaldehyde at the para and both ortho positions, the ideal stoichiometry (or F/P ratio) from the standpoint of favoring a fully cross-linked polymer, is 1.5:1. As a practical matter, however, the minimum F/P ratio is 1.6:1 to insure sufficient reaction of formaldehyde with phenol. It has been observed that effecting the condensation reaction of F/P ratios above 2.2:1 such as at 2.4:1, provides resoles which, upon foaming, in turn provide foams which suffer from undesirable voids and stress cracks, that is, foam processability is poor and is thus unacceptable. Such defects are believed attributable to the presence of too large an excess of free formaldehyde in the resole. Moreover, resoles produced at F/P ratios above 2.2:1 provide foams having a strong formaldehyde odor which is of course undesirable.

The formaldehyde reactant is added to the condensation reaction usually as an aqueous solution containing from about 30 to about 50 weight percent or more of formaldehyde, or in the form of its low molecular weight polymers such as paraformaldehyde. It is to be understood that formaldehyde may also be added to the condensation reaction in the form of other substances capable of providing free formaldehyde under the condensation conditions described herein.

The condensation is base-catalyzed and is usually effected in the presence of a compound of an alkaline metal, that is, a compound of an alkali metal or an alkaline earth metal. Such compounds are suitably hydroxides, carbonates, bicarbonates or oxides. Illustrative of suitable catalysts are the respective hydroxides of lithium, sodium, potassium and barium, as well as sodium and potassium carbonates, bicarbonates, calcium oxide, and the like. The more usual catalysts are sodium, potassium, and barium hydroxides of which sodium hydroxide is especially suitable.

Although it is essential to effect the phenol/formaldehyde condensation at a formaldehyde-to-phenol mole ratio from about 1.6:1 to about 2.2:1, it is to be understood that the other condensation reaction conditions, that is, temperature, pressure, reaction time and catalyst concentration are not critical per se. It is necessary, however, that the combination of reaction conditions be adjusted so as to achieve the formation of resole products having the viscosity/water relationship defined herein. Thus, any combination of reaction temperature, pressure, time and catalyst concentration may be utilized provided the resole product is advanced to a point such that a plot of log viscosity against water content falls, or is capable of falling, within the areas bound by aforementioned points (i)–(iv) for the specified F/P ratios. Most suitable, of course, is to advance the condensate to an end-point at which a plot of the log viscosity against water content of samples of the resole, actually falls within the area defined herein for the particular formaldehyde-to-phenol mole ratio employed. By use of the defined log viscosity/water relationship as an end-point for the condensation reaction, any combination of conditions can be applied, and thereafter set, with reasonable assurance that the resole product will be reproducible from the standpoint of its performance as a foamable resin. That is, the resole will be capable of being foamed to cellular products having a friability resistance of less than 35 percent weight loss and a compressive strength of at least about 20 pounds per square inch within a foam density range from about 1.90 to about 3.70 pounds per cubic foot. With this understanding, the following condensation reaction conditions are set forth as a general guideline.

The condensation reaction may be effected at temperatures between about 50° C. and about 150° C. The usual reaction temperature ranges from about 75° C. to about 110° C.

The pressure at which the condensation reaction is effected may vary over a relatively wide range such as from about 3 to about 70 pounds per square inch absolute (psia.). The reaction is usually effected at a moderately reduced pressure up to atmospheric, that is, at pressures from about 7 up to about 15 psia. The pressure is, of course, adjusted consistent with the desired reaction temperature. For example, although the condensation reaction is suitably effected under atmospheric reflux conditions (about 100°–105° C.), the reaction may be effected at temperatures below the atmospheric boiling point of the reaction mixture by operating at a reduced pressure. Likewise, when operating at higher temperatures, the reaction is effected at a pressure above atmospheric.

The condensation reaction time may vary from about 0.5 to about 8.0 hours, and is usually at least about 0.75 and no more than about 5 hours.

The catalyst concentration may range from about 0.01 to about 0.10, and is usually no more than about 0.02, mole of base per mole of phenol fed to the condensation reaction zone.

Due to the presence of alkaline condensation catalyst therein, the aqueous condensate is of course alkaline. The aqueous condensate is rendered non-alkaline by the addition thereto of an acidic compound or acid-forming compound such that the resole is brought to a neutral point which for phenol/formaldehyde resoles, is a pH within the range from about 5.0 to about 7.0. Preferably, the aqueous alkaline condensate is neutralized to a pH within the range from about 5.5 to about 7.0, and is most preferably brought to a pH no higher than about 6.7. Illustrative of suitable acidic compounds and acid-forming compounds reported in the prior art as useful for the purpose of neutralizing alkaline condensate are: hydrochloric acid, sulfuric acid, phosphoric acid, acetic acid, formic acid, oxalic acid, carbon dioxide or any other inorganic or organic acid including the organic sulfonic acids described hereinbelow as suitable foaming catalysts. Depending upon any one or more of a number of factors such as the particular alkaline catalyst employed, the acidic compound used for neutralization of condensate and the water content to which the resole is subsequently brought, the salt of neutralization remains solubilized in the resole or some portion thereof may precipitate. In the latter event, filtration or other liquid-solids separation technique is required to separate the precipitated salts. However, the use of sodium hydroxide, potassium hydroxide and barium hydroxide as the condensation catalyst and neutralization with sulfuric acid, phosphoric acid, or acetic acid, does not ordinarily result in the formation of salts which precipitate at ambient temperatures. In any event, salts of neutralization remain in the resole product. In view of the utilization of an added acidic compound to neutralize the aqueous alkaline condensate and thereby form salts, the resoles of the invention are to be distinguished from those which have been prepared by treatment of condensate with ion exchange resins such as, in particular, the resoles described and claimed in aforementioned U.S. Pat. No. 4,033,909.

The phenol/formaldehyde condensate is aqueous, the water content thereof generally ranging from about 10 to about 60 weight percent, and is usually no more than about 40 to about 50 weight percent. Water may be introduced to the system with the formaldehyde which is usually added as an aqueous solution, or with the catalyst which, in the case of alkali metal hydroxides, is usually added as a preformed aqueous solution. Varying amounts of water are also formed as by-product during the condensation reaction. Concentration of liquid condensate to a particular predetermined water content is readily accomplished by conventional stripping at reduced pressure such as, for example, at a rendered pressure from about one to about 200 mm. mercury, and at temperatures from about 30° to about 75° C.

In accordance with the preferred method of preparation, the resole is advanced to the desired average molecular weight, as reflected by the herein-defined viscosity/water relationship, during the initial condensation reaction, that is, in the presence of the alkaline catalyst. It is to be understood, however, that advancement to the desired end-point may be accomplished in two-stages. Thus, in those instances where the neutralized condensate falls short of the desired average molecular weight, it may be heated to further advance the intermediate product to an end-point which, depending upon the particular F/P mole ratio employed in the initial condensation reaction, does fall within one of the areas defined by the respective series of points (i)–(iv). This is accomplished by so-called ∓bodying" of the neutralized resole at a temperature from about 25° C. to about 130° C. or higher and at a reduced pressure from about 0.4 to about 40 psia. or higher, for a period of from about 0.1 to about 24 hours or until the desired end-point is reached. However, inasmuch as curtailing the condensation reaction and completing the preparation of the resole by "bodying" is, in effect, a two-stage operation, it is less preferred than the method which comprises bringing the resole to the desired extent of advancement during the base-catalyzed condensation reaction.

Figure 2:
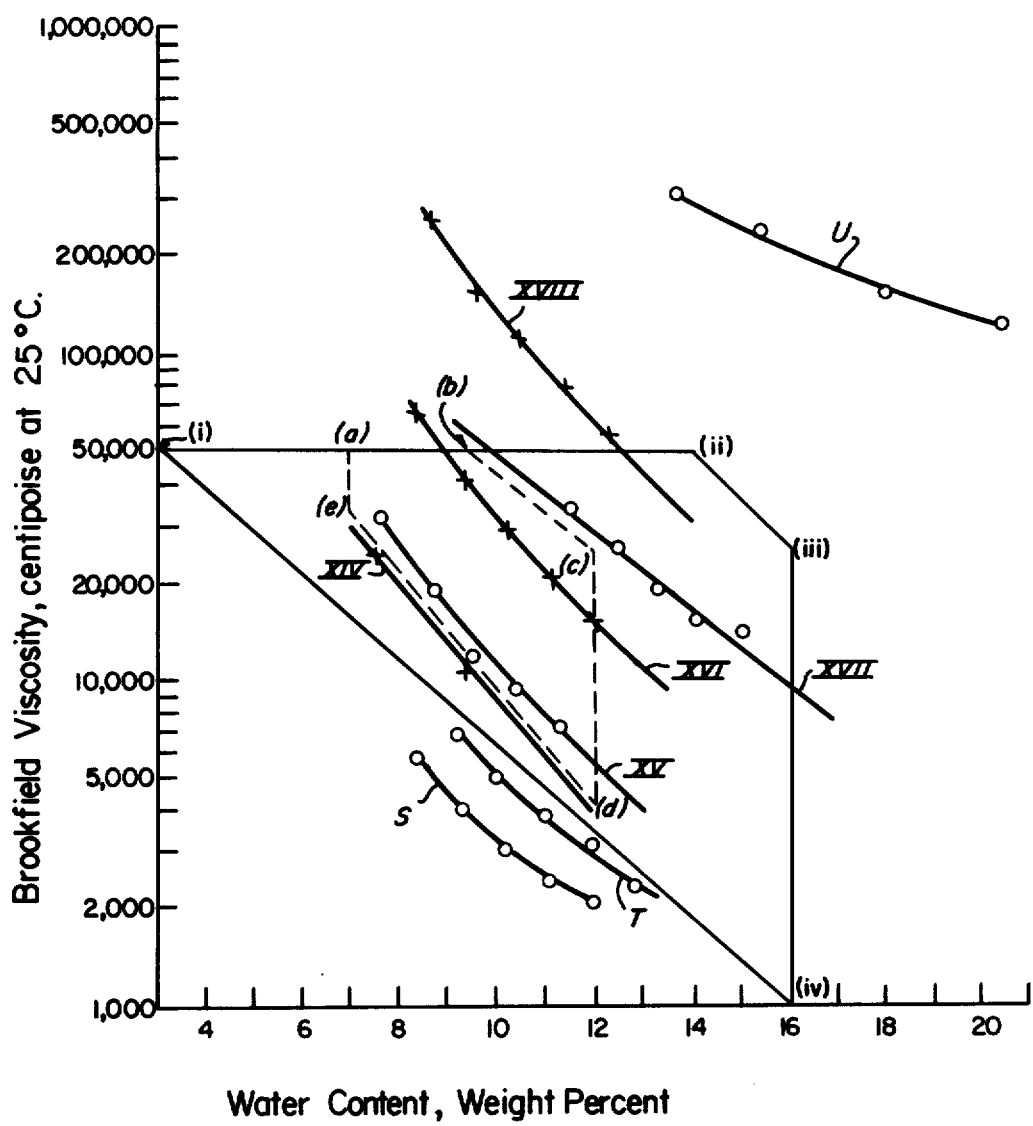
FIG. 2 is a graph, also on a logarithmic scale, of resole viscosity as a function of water content where the particular resoles has been condensed at a formaldehyde-to-phenol mole ratio of about 1.75 using sodium hydroxide as the condensation catalyst.

Preferred resoles of the invention are those characterized by a viscosity/water relationship which falls within the pentagonal-shaped area enclosed by the dashed lines shown on FIGS. 1 and 2. More particularly, when the F/P ratio is at least 1.9 and no more than about 2.2 moles of formaldehyde per mole of phenol, the preferred resoles of the invention are those having a viscosity/water relationship which falls, or is capable of falling, within the area defined by straight line interconnection in series of points (a) to (e) on a graphically depicted plot of log viscosity as a function of water content, where points (a)–(e) are shown on FIG. 1 and are:

(a) a viscosity of about 50,000 centipoise at a water content of about 7.0 weight percent;

(b) a viscosity of about 50,000 centipoise at a water content of about 9.5 weight percent;

(c) a viscosity of about 26,000 centipoise at a water content of about 12.0 weight percent;

(d) a viscosity of about 4,000 centipoise at a water content of about 12.0 weight percent; and (e) a viscosity of about 20,000 centipoise at a water content of about 7.0 weight percent.

Further, when the F/P ratio is at least 1.7 and less than 1.9 moles of formaldehyde per mole of phenol, the preferred resoles of the invention are those having a viscosity/water relationship which falls, or is capable of falling, within the area defined by straight line interconnection in series of points (a) to (e) on a graphically depicted plot of log viscosity as a function of water content, where points (a)–(e) are shown on FIG. 2 and are:

(a) a viscosity of about 50,000 centipoise at a water content of about 7.0 weight percent;

(b) a viscosity of about 50,000 centipoise at a water content of about 9.5 weight percent;

(c) a viscosity of about 25,000 centipoise at a water content of about 12.0 weight percent;

(d) a viscosity of about 4200 centipoise at a water content of about 12.0 weight percent; and (e) a viscosity of about 34,000 centipoise at a water content of about 7.0 weight percent.

(B) The foamed Products and Foam Formulations

As stated hereinabove, the phenol/formaldehyde resoles of the invention are foamable to cellular products having a density from about 1.90 to about 3.70 pounds per cubic foot (pcf.) and, within this density range, a friability of less than 35 percent weight loss and a compressive strength of at least about 20 pounds per square inch (psi.). These particular mechanical property specifications together with foam processability, were chosen as the standard against which performance of the resoles as foamable resins was measured. This standard for foam performance is significant inasmuch as it is otherwise difficult to obtain, on a reproducible and consistent basis, the specified combination of properties from ordinary resoles derived solely from phenol and formaldehyde without the addition of special ingredients to the foam formulation, as discussed hereinabove. Notwithstanding the fact that the resoles of the present invention are capable of providing phenolic foam having the aforementioned combination of properties, it is to be understood that their utility is not limited to the formation of foam having such properties. For example, the resoles of the invention may be used to provide foam having a density outside of the 1.90–3.70 pcf. range such as, for example, foam having a density as low as one pcf. or as high as 10 pcf., by proper adjustment of the relative proportion of foam formulation components such as the blowing agent and/or catalyst. Moreover, the resoles may be used for formation of non-cellular products. For example, the resoles of the invention may be used as components of adhesives, in forming laminates and for other general bonding and fabrication applications.

The catalyst component of the foam formulation may be an inorganic acid or an organic acid and is usually a relatively strong acid added to the formulation as an aqueous solution. Illustrative of suitable acidic catalysts for foam polymer formation are any of the following: hydrochloric acid; sulfuric acid; phosphoric acid; fluoboric acid; formic acid; oxalic acid; mixtures of acidic catalysts based on boric acid or its anhydride with organic hydroxy acids having a hydroxyl group on a carbon atom no more than one carbon atom removed from the carboxyl group such as, in particular, oxalic acid, as described in U.S. Pat. No. 3,298,973; and other acid catalysts known to the art of phenolic foam formation.

The generally preferred class of foaming catalysts are organic sulfonic acids. Illustrative are: benzene sulfonic acid, toluene sulfonic acid, xylene sulfonic acid, phenol sulfonic acid, ethane sulfonic acid, butane sulfonic acid and the like, as well as resin sulfonic acids such as the phenol-sulfuric acid-formaldehyde reaction products described in British Pat. No. 1,288,113. An especially preferred foaming catalyst is phenol sulfonic acid which is available commercially as an aqueous solution and is suitably employed as such.

It is to be understood that the organic sulfonic acids may be used as essentially the sole catalyst of the foam formulation, or they may be used in combination with one another, as well as in combination with other acids. Illustrative of suitable mixtures of organic sulfonic acids are those containing toluene sulfonic acid in combination with other aromatic sulfonic acids such as, in particular, xylene sulfonic acid, as described in U.S. Pat. No. 3,458,449. Modified toluene sulfonic acid available from Witco Chemical Company, Inc., as ULTRA TX Acid, is also a suitable foaming catalyst and is of the type described in the latter patent.

Examples of useful blends of organic sulfonic acids with other types of acids are those containing phenol sulfonic acid in combination with phosphoric acid (70 to 85 weight percent) and/or boric acid.

The concentration of acid component contained in the foam formulation may vary over a relatively wide range such as from about 0.5 to about 20 parts by weight per 100 parts by weight of the resole component. The more usual concentration is from about 2 to about 15 weight percent, based on resole. As a guideline, the catalyst is generally present in the minimum amount that will provide desired cream times of 0.5 to 3 minutes and rise times of 1 to 10 minutes.

As the source of blowing action, any blowing agent known to the art of phenolic foam formation may be employed in foaming the resoles of this invention. For example, one class of suitable blowing agents are the polyhalogenated saturated hydrocarbons having a boiling point (at atmospheric pressure) within the range from about minus 40° F. up to about 200° F., and are as described in U.S. Pat. No. 3,389,094. Such compounds, as defined in said patent, are organic compounds which are free of aliphatic and aromatic unsaturation and have more than one halogen atom bonded to aliphatic carbons, at least one halogen being fluorine. Illustrative of this class of suitable blowing agents are trichloromonofluoromethane, 1,1,2-trichloro-1,2,2-trifluoroethane (CCl₂FCClF₂), dichlorodifluoromethane, 1,2-difluoroethane and 1,1,1,2-tetrachloro-2,2-difluoroethane. Other halogenated blowing agents are chlorohydrocarbons such as methylene chloride, 1,2-dichloroethane and 1,2-dichloroethylene.

Another class of suitable foaming agents are the aliphatic ethers having a boiling point between 30° C. and 100° C. such as diethyl ether, diisopropyl ether and other such compounds described in U.S. Pat. No. 2,845,396, as well as petroleum ether (fraction having an atmospheric boiling range from about 38° to about 46° C.). Also suitable are liquid hydrocarbons having an atmospheric pressure boiling point from about minus 50° to about 100° C., preferably from about 20° to about 50° C. such as n-pentane, cyclopentane and 2-methylbutane.

Another blowing agent which may be employed in providing phenolic foam from the resoles of the present invention is methyl formate in combination with 1,1,2-trichloro-1,2,2-trifluoroethane. Such combinations contain from about 5 to about 80 weight percent of methyl formate and are added to the formulation in an amount such that at least about 0.4 and no more than about 20 parts by weight of methyl formate is added to the formulation per 100 parts by weight of resole. This particular blowing agent and its use in the formation of phenolic foam is described in aforementioned U.S. Pat. No. 4,033,910.

As will be evident to those skilled in the foaming art, when the blowing agent has a boiling point at or below ambient temperature, it is maintained under pressure until mixed with the other components of the foam formulation.

Generally, the blowing agent is used in an amount sufficient to provide foam having a predetermined density which is preferably between about 1.9 and about 3.7 pounds per cubic foot, and is most preferably from about 2.0 to about 3.0 pcf. It is to be understood, however, that the resoles of the invention are also useful in providing phenolic foam outside of the aforesaid 1.9–3.7 pcf. density range. In general, the blowing agent is used in an amount between about 2 and about 40 parts by weight per 100 parts by weight of resole contained in the foam formulation. As a guideline, the lower concentrations within this range favor formation of the higher density foam, and higher concentrations favor formation of lower density foam.

Usually, the foam formulation also contains a surface active component. One class of suitable surface active components are organic surfactants. Illustrative of this class are non-ionic organic surfactants such as condensation products of alkylene oxides (as illustrated by ethylene oxide, propylene oxide or combinations thereof) and alkylphenols such as nonylphenol, dodecylphenol and the like. Other suitable organic surface active agents include the organic poly(oxyethylene) fatty glyceride available as Atlas G-1292 from ICI United States, Inc., as well as other organic surfactants known to the phenolic foaming art such as, for example, those disclosed in U.S. Pat. No. 3,389,094, the teachings of which in this regard are incorporated as part of the present disclosure by reference thereto.

Also suitable as the surfactant component of the foam formulation are the polysiloxane-polyoxyalkylene copolymers described in U.S. Pat. No. 3,271,331 the teachings of which in this regard are also incorporated herein by reference thereto. Illustrative of such polysiloxane-polyoxyalkylene copolymers are the polymethylsiloxane-polyoxyethylene copolymers and polymethylsiloxane-poly(oxyethylene-oxypropylene) copolymers, including combinations thereof, having the following average composition,

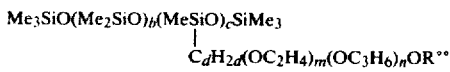

wherein: Me is methyl; R°° is hydrogen or alkyl having from one to four carbon atoms; b has an average value from about 3 to about 100; c has an average value from about 2 to about 10; d has a value from 2 to 4; m has an average value from about 4 to about 30; and n is zero or a positive number having an average value up to about 25. Examples of suitable polydimethylsiloxane-polyoxyalkylene copolymers are those available commercially under the tradenames L-5420, L-5430 and L-5310 Silicone Surfactants, respectively (Union Carbide Corporation), and under the tradename DC-193 (Dow Corning Corporation).

A still further class of suitable surface active components of the foam formulation are the aralkyl-polyalkylsiloxanes described in aforementioned copending application Ser. No. 649,815, filed Jan. 16, 1976, now U.S. Pat. No. 4,070,313, granted Jan. 24, 1978. Of this class, the phenylethylmethylsiloxy dimethylsiloxane oils are especially useful.

Other components which may be present during the formation of phenolic foam in accordance with the teachings of this invention are fillers, pigments, dyes, and like additives known to the phenolic foaming art, as well as ingredients which improve punking resistance.

In this latter respect it is noted, as previously referred to herein, that foams derived from preferred resoles of the invention which were formed on a bench scale in accordance with the "bench mix" foam procedure described hereinbelow, exhibited a very low punking extent of 0–5 percent weight loss, as determined in the "torch test" also described hereinbelow. On the other hand, when foams were made by machine as opposed to the "bench mix" procedure, erratic punking behavior was observed, although the mechanical properties (density, friability resistance and compressive strength) were consistent with those achieved in the bench scale tests. The reasons for the inconsistent punking results obtained for machine made slabstock are not understood but they may be due to a number of process related factors. Such factors include the manner by which the foam formulation ingredients were mixed, the higher temperature (about 97° F.) at which the ingredients were continuously fed to the mix in forming the machine-made foams, as opposed to the ambient temperature (e.g., about 77° F.) at which the ingredients were fed in the bench procedure, or other such mechanical and process variables. In any event, notwithstanding the apparent improvement in punking resistance of foams derived from resoles of the invention and, in view of the hazardous nature of punking, it is recommended that ingredients which favor further overall reduction in punking extent be incorporated in the foam formulation. Such ingredients include phosphoric acid and/or borid acid which have been previously disclosed herein as suitable components of the acid catalyst system, particularly in combination with organic sulfonic acids such as phenol sulfonic acid. Examples of such combinations are: (1) about 8 parts by weight of phenol sulfonic acid and from about 0.5 to about 3 parts by weight of 70 to 85 percent by weight phosphoric acid; and (2) about 8 parts by weight of phenol sulfonic acid and from about 3 to about 5 parts by weight of boric acid, where the parts by weight are per 100 parts by weight of resole contained in the foam formulation. Other additives which are beneficial in improving punking resistance include PHOS-CHEK P/30 (supplied by Monsanto Company and which, in accordance with Monsanto's Technical Bulletin 1-270 is an ammonium polyphosphate), as well as the phosphorus compounds disclosed in U.S. Pat. No. 3,673,130 such as, in particular, tetrakis(hydroxymethyl)phosphonium chloride.

The examples set forth hereinbelow are illustrative of the present invention and are not to be construed as unduly limiting.

The values for viscosity of the phenol/formaldehyde resoles described herein, the content in the resoles of water, unreacted formaldehyde and phenol, and the weight average molecular weights, are based on the respective test methods described below.

A. Measurement of Resole Viscosity

Viscosity, reported in centipoise (cps.), was determined by use of a Brookfield Viscometer Model LVT. Measurements were made by adjusting the temperature of the resole to 25.0° C. and choosing a spindle to give a mid-range reading at 0.3 to 60 revolutions per minute. Readings were taken when a constant value was obtained which usually occurred in one to three minutes.

B. Resole Water Content

Water content of the resoles was measured in accordance with the method of Karl Fischer, modified to determine the endpoint of the titration electrometrically using a milliampere meter. The Karl Fischer titrating reagent is a standard mixture of pyridine, sulfur dioxide and iodine. Anhydrous methanol is used as the solvent medium for the resole. The titrating reagent is added to the solvent medium until the indicator of the meter holds at a steady value (e.g., 100 or 150 microamperes) which value is taken as the endpoint. A known amount of water (usually 0.15 gram) is then weighed into the titrated solvent medium, and the resultant solution is then titrated with the titrating reagent until the indicator of the meter holds steady at the same endpoint; based on this standardization procedure, the grams of water per milliliter of titrating reagent can be calculated. The sample (0.5–1.0 gram) of resole to be analyzed is then added to the same solvent medium employed in the standardization step and is titrated with the titrating reagent until the indicator of the meter holds steady at the previously determined endpoint. The water content of the sample is then calculated as follows:

$$\frac{A \times \text{Iodine Factor}}{\text{grams of resole sample}} \times 100 = \text{weight percent water}$$

where: A is the number of milliliters of titrating reagent required for the sample to reach the endpoint, and Iodine Factor is the grams of water per milliliter of titrating reagent, as previously determined.

C. Formaldehyde Content

The procedure employed in determining the unreacted formaldehyde of the resole involves the following steps:

A 75 ml. aliquot of a 1.0 normal aqueous solution of hydroxylamine hydrochloride (HONH$_2$.HCl) contained in a 250 ml. beaker is agitated and, using a pH meter, is titrated with 0.2 normal sulfuric acid until the pH of the solution is 4.0. A weighed sample of resole (usually 6.0 to 6.2 grams) contained in a 250 ml. beaker is dissolved in 75 ml. of added methanol, and is titrated using a pH meter with sulfuric acid (0.2 normal) or sodium hydroxide (about 1 normal), as required, until the pH of the solution is 4.0, followed by the addition thereto of the aforementioned solution of hydroxylamine hydrochloride which has been titrated to a pH of 4.0. The combined solution is stirred for five minutes and is then titrated with aqueous sodium hydroxide (about 1 normal) until the pH of the solution is 4.0. A blank run is made using 75 ml. of the methanol solvent and 75 ml. of the hydroxylamine hydrochloride, and titrating the resultant solution to a pH of 4.0 using the same aqueous sodium hydroxide solution (about 1 normal). The formaldehyde content of the resole sample is calculated as follows:

$$\frac{3.002 \times (A \text{ minus } B) \times F}{\text{weight of resole sample}} = \text{weight percent formaldehyde}$$

wherein:
3.002 is a constant and is the milliequivalent weight of formaldehyde multiplied by 100;
A is the number of milliliters of aqueous sodium hydroxide required to bring the combined solution to a pH of 4.0;
B is the number of milliliters of aqueous sodium hydroxide required to bring the blank solution to a pH of 4.0; and
F is the actual normality of the aqueous sodium hydroxide solution used in the determination of A and B.

D. Phenol Content

The content of phenol in the resole was determined by gas chromatography. The gas chromatographic analysis was carried out in a stainless steel column (6 feet in length, ¼ inch O.D.) packed with Tenax GC (60/80 mesh) at an oven temperature of 185° C. In the calibration of the column using butyl CELLOSOLVE as the internal standard, as well as in the analysis of the resole sample, helium was used as the carrier gas and was passed through the column at a rate of 60 cc. per minute. The column was calibrated using a 10 microliter sample of: phenol (1.73 weight percent); butyl CELLOSOLVE (60.73 weight percent); and, as the remainder or blank component, isopropanol (37.54 weight percent). After a three-minute flow of helium through the column, three respective peaks were obtained at the retention times indicated parenthetically: isopropanol (2 minutes); butyl CELLOSOLVE (5 minutes) and phenol (19 minutes). The ratio of the latter two peaks establishes the sensitivity of phenol in butyl CELLOSOLVE at the known concentration of each in the standard solution. Once the column has been calibrated, approximately one gram of the resole to be analyzed is dissolved in 2.5 grams of butyl CELLOSOLVE and, after mixing, 10 microliters of the resultant solution is injected into the column to provide a gas chromatograph having two peaks (phenol and butyl CELLOSOLVE). Inasmuch as the areas of the various peaks are proportional to the concentration of the solution components, the concentration of phenol in the resole sample is determined from the ratio of the respective areas of the peaks obtained for phenol in the analysis of the resole and in the calibration. Although the peaks can be measured by any conventional technique, in the particular procedure employed herein, the peaks were measured using a computer data handling system.

E. Weight Average Molecular Weight Calculation

In the data which follows, values for the approximate weight average molecular weight of the resoles are given. These values are calculated values based on analysis by Gel Permeation Chromatography to determine molecular size of the molecular species of the resole. The instrument used in carrying out the the analyses was the Gel Permeation Chromatograph available from Waters Associates, Inc., Model 200, having 5 columns (arranged in series, each four feet in length) packed with Styragel having a pore size of $1.5 \times 10^4$, 1000, 250, 60 and 60 Angstroms, respectively. Detection is by differential refractive index. The system is operated with tetrahydrofuran ("THF") as solvent and at a flow rate of approximately one milliliter per minute. The sample of resole, weighing about 200 milligrams, is made up in THF to provide a concentration of approximately 3 milligrams of resole per milliliter of solvent, and is injected into one of six sample loops, each having an internal volume of 2.0 milliliters. (Loop-to-loop variation is less than about 2 percent). To avoid variations due to solvent evaporation, the solutions were transferred with minimal exposure to air, and were weighed in stoppered flasks using at least 100 milliliters of total solution. The chromatograph was calibrated using polystyrene as the standard polymer against which the size of the polymer species of the resole sample was measured. The calibration was also conducted at room temperature using THF as the solvent for the polystyrene. The use of polystyrene as the standard assumes that a given sized phenol/formaldehyde resole molecule elutes at about the same place as the same size polystyrene molecule. Based on this assumption, which has not been verified in view of the complex nature of phenol/formaldehyde resins, the size in Angstroms of the molecular species of the resin is determined. The latter value is then multiplied by a factor of 12.5 which is based on the further assumption that the repeating unit of the phenol/formaldehyde polymer is

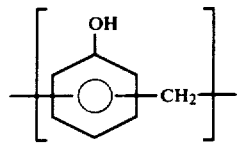

The calculated value is taken as the weight average molecular weight of the resole and is reported as "GPC, $M_w$". In view of the aforesaid assumptions on which the reported values are based, it is to be understood that these calculations are not precise and do not reflect the actual or intrinsic molecular weight of the polymeric species of the resoles which, in view of their complex nature and the usual presence of water, cannot be easily determined by analytical methods. Although gel permeation chromatography was used in an effort to characterize the resoles of the invention and, although the GPC, $M_w$ values may be meaningful relative to one another and may indicate certain trends, it is a far less satisfactory means of reflecting the extent to which phenol/formaldehyde resoles must be advanced to achieve good performance as a foamable resin, than the viscosity/water relationship described herein.

In the phenolic foam preparations described in the examples and comparative runs which follow, the foam formulations, designated Formulations I, II and III, had the respective compositions given in the following Table I.

TABLE I

| FOAM FORMULATIONS | | | |
|---|---|---|---|
| Formulation No. | I | II | III |
| Component | Parts By Weight | | |
| Resole | 100 | 100 | 100 |
| Catalyst: | | | |
| Phenolsulfonic acid as a 65 weight per cent aqueous solution[1] | 8 | 8 | 8 |
| Blowing Agent: | | | |
| 1,1,2-Trichloro-1,2,2-trifluoroethane | 9 | 9 | 12 |
| Surfactant: | | | |
| Polymethylsiloxane-polyoxyethylene copolymer[2] | 2 | 2 | 2 |
| Water[3] | 0 | 2 | 0 |

[1] As supplied by U.S. Pipe and Foundry.
[2] Silicone Surfactant L-5420 (Union Carbide Corporation)
[3] Used to reduce catalyst activity or otherwise to decrease the overall reactivity of the reaction mixture.

General Foaming Procedure ("Bench Mix")

The foams of the examples and comparative runs were prepared following substantially the same procedure, as follows. Resole (400.0 grams; 20°-25° C.) is weighed in a tared one-quart cardboard cup with wooden tongue blade included. The surfactant, blowing agent and water (when used as a component of the foam formulation) are weighed and blended with the resole using the tongue blade. Additional blowing agent is added if any is lost during the initial blending. Catalyst is weighed separately in a glass beaker. All ingredients in the cardboard cup (minus the tongue blade) are premixed for 50 seconds at about 650 revolutions per minute using a drill press equipped with a stainless steel shaft fitted with a twin-blade marine propellor. The stirring speed is increased to 1500 revolutions per minute for 10 seconds and then the catalyst is poured into the stirring premix over a period of 5 seconds. Stirring is continued at 1500 revolutions per minute until 30 seconds after the start of catalyst addition. The resultant blend is poured immediately into a cardboard box (8 inches × 8 inches × 6 inches) held in a wooden frame; both the cardboard box and wooden frame are first preheated for 7 minutes in an oven at 125° C. and removed from the oven just before stirring in the drill press is started.

During the foaming procedure, the cream and rise times are recorded. The "cream time" is taken as the interval of time from catalyst addition until the blend visibly begins to expand which is noted when a bubble at the boundary between the foaming mixture and wall of the cardboard box begins to move out of sight. Generally, the cream times were from about 1 to about 2 minutes. "Rise time" is measured from the time of catalyst addition until expansion ceases. Generally, the rise times were from about 2 to about 7 minutes.

The foams are allowed to stand at least 18 hours before being cut with a meat saw. The cut samples are allowed to stand at least 24 hours before physical property determinations.

Evaluation Of Foam Processability

When the foam is sliced into samples by sawing, the foam is inspected visually to determine if any holes (or voids) are present. The presence of an excessive number of holes has an adverse affect on foam strength, and is usually observed in foams made from resoles which are not sufficiently advanced. Insufficient advancement or too low a molecular weight leads to a reaction exotherm which in turn is too rapid with resulting formation of voids, that is, the resole is too reactive. At the other extreme, voids are also often observed when the resole is "too dead" that is, when gellation of the resole or its advancement to higher molecular weight species occurs too far ahead of the exotherm necessary for a satisfactory foaming reaction. In this context, "foam processability" was evaluated and correspondingly rated as set forth in Table II which follows.

TABLE II

| Number of Holes In Foam | Evaluation | Rating |
|---|---|---|
| None | Mild | OK[1] |
| One or two small holes but a large enough portion of the foam with no holes was available for testing. | Mild to moderate | OK[1] |
| Numerous small holes, but a large enough portion of the foam was available for testing | Moderate | NG[2] |
| Numerous small holes and too small a portion of the foam without holes was available for testing. | Severe | NG[2] |
| Foam loaded with holes without any satisfactory portion of the foam available for testing. | Very Severe | NG[2] |

[1]Foam acceptable for use.
[2]Foam not acceptable for use.

Also taken into account in evaluating foam processability was the severity of stress cracks in the foam and the viscosity of the resole. Thus, in some instances, foam processability was "OK" from the standpoint of void formation, but was rated "NG" because of surface cracks severe enough to be recorded. Foam processability was also given an "NG" rating when initial resole viscosity was so high to indicate that the resole was too far advanced either to provide foam having an acceptable combination of mechanical properties or to allow for homogeneous mixing with the foam formulation ingredients.

The properties (density, compressive strength, friability resistance and punking behavior) of the phenolic foams described herein, are based on the test methods described below.

A. Foam Density

Foam density of foam samples cut from the core of the specimen was determined in accordance with ASTM D-1632 and is reported in pounds per cubic foot (pcf.). The estimated accuracy of these values is ±0.02.

B. Compressive Strength

Compressive strength of two-inch cubes of foam, parallel to the direction of foam rise, was measured in accordance with ASTM D-1621 and is reported in pounds per square inch (psi.). The estimated accuracy of these values of ±0.2.

C. Friability Resistance

Friability was measured using ASTM C-421 except that the test specimens were conditioned at room temperature (as in ASTM C-367). Further, the two-minute test of ASTM C-421 was not done. Samples were tumbled for ten minutes after being placed in the testing machine, and the percent weight loss of the sample was then determined, as follows:

$$\frac{W_1 \text{ minus } W_2}{W_1} \times 100 = \% \text{ weight loss after 10 minutes}$$

where: $W_1$ and $W_2$ are the respective weights of the sample before and after tumbling. The estimated accuracy of these values is ±0.5.

D. Foam Punking ("Torch Test")

The apparatus employed in this test consists of a foam sample holder and flame burner head. The sample holder is a ring clamp having a 3-inch diameter opening, and is positioned 3.0±0.25 inches above the top edge of the burner head. The burner head is positioned vertically below the center of the 3-inch diameter opening of the sample holder. The flame burner equipment is a propane gas source connected to a pencil-flame burner head with matching fuel orifice, equivalent to Bernz-O-Matic propane Maxi-torch kit Model JJ25M with burner unit parts JJ680. The test specimens of foam are five-inch cubes cut from the foam slab product. (In two instances the foam sample was less than five inches on one or more sides because of lack of enough sample, but in these instances the sample was not less than two inches on each side. This modified procedure sometimes required a ring clamp with a one-inch diameter. The tests which deviated from a five-inch cube sample, are designated "MT" for "modified test.") The foam specimen is placed atop the sample holder with the direction of rise parallel to the flame. The punking test is conducted in a hood at 73°±5° F. at an air flow rate of 100 feet per minute. Before the test foam is inserted, the burner is lit and adjusted to produce a steady test flame with a 1.5±0.25 inch-long blue inner cone. The test flame is left on for not less than 3 minutes without a foam specimen in place. The foam specimen is weighed ($W_1$) and then positioned on the sample holder as quickly as possible and a timer is started. The duration of the initial phase of the test, referred to as the "burn time", is for five minutes. After the five minute burn, the sample is removed and immediately weighed ($W_2$). While remaining in the hood at least one foot away from the torch, the foam sample is weighed intermittently until a constant weight is obtained ($W_3$) and until at least 30 minutes has elapsed and the internal temperature of the foam is less than 30° C., as measured with a Weston Dial Thermometer (Fischer Scientific Co.). The percent weight loss occurring between $W_2$ and $W_3$, if any, is determined and from this difference, the punking extent ("PE") is calculated. Thus, the punking extent is calculated as follows:

$$\frac{W_2 \text{ minus } W_3}{W_2} \times 100 = \text{punking extent } (PE)$$

and is expressed as percent weight loss due to punking. Foams were rated as follows:

| Punking Extent | Rating |
| --- | --- |
| 0 to 5.0% weight loss | Non-punking or "NO" |
| greater than 5.0% weight loss | Punking or "YES" |

It is to be understood that the "non-punking" or "NO" rating assigned to phenolic foams described herein is based on the results obtained in the above-described "torch test" and may not be indicative of punking behavior of the foams when subjected to more stringent tests such as the Factory Mutual Susceptibility to Heat Damage Test, The Factory Mutual Calorimeter Test, and the ASTM E-84 Tunnel Test.

Overall Foam Rating

The performance of the resoles of the examples and comparative runs was evaluated from the standpoint of five criteria, namely, foam processability as above-defined, foam density, friability, compressive strength and punking behavior. The target properties are:

| (1) | Foam Processability | = | "OK" rating |
| --- | --- | --- | --- |
| (2) | Density, pcf. | = | 1.90–3.70 |
| (3) | Compressive strength, parallel, psi. | = | at least 20 |
| (4) | Friability, % weight loss after 10 minutes | = | less than 35 |
| (5) | Punking | = | "NO" rating |

In those instances where the resole provided foam having a foam processability of "NG", the foam was assigned an unacceptable or "UA" rating. Further, an unacceptable (UA) foam rating was also assigned to those foams which, although having acceptable (OK) foam processability, failed to meet any one of above-specified target properties (2), (3) and (4). Otherwise, the foam was given a rating of 4 to 7, which ratings are defined as follows.

A rating of "4" signifies that the foam had: (1) acceptable foam processability, (2) a density of 1.90–3.70 pcf., and within this density range, (3) a compressive strength of at least 20 psi., and (4) a friability of less than 35 percent weight loss.

A rating of "5" denotes that the foam had: (1) acceptable foam processability, (2) a density of 1.90–3.70 pcf., and within this density range, (3) a compressive strength of at least 20 psi., (4) a friability of less than 35 percent weight loss, and (5) a punking extent which qualified the foam for a "NO" rating.

A foam rating of "6" signifies that the foam had: (1) acceptable foam processability, (2) a density of 2.00–3.00 pcf., and within this density range, (3) a compressive strength of at least 25 psi., and (4) a friability of less than 25 percent weight loss.

A foam rating of "7" signifies that the foam had: (1) acceptable foam processability, (2) a density from 2.00 to 3.00 pcf., and within this density range, (3) a compressive strength of at least 25 psi., (4) a friability of less than 25 percent weight loss and (5) a punking extent which qualified the foam for a "NO" rating.

Viscosity/Water Dilution Evaluation

The data which follows also includes the results of water dilution studies to determine the effect on resole viscosity of variation in water content. In these studies, water was added incrementally to the given resole and the viscosity (Brookfield at 25.0° C.) of the diluted resole at each water level was measured. In reporting the results, the first set of values given for viscosity and water are as determined prior to the addition of water to the initially prepared resins which were kept under refrigeration (about minus 20° C.) prior to their evaluation. The respective series of viscosity/water measurements were used as the basis for the plots of log viscosity as a function of water content shown in FIGS. 1, 2 and 3. In general, the viscosity/water dilution curves for resoles within the invention were straight lines, substantially parallel to one another. Also included in the tabulated data given hereinbelow are values for resole viscosity (25.0° C.) extrapolated to a water content of 12 weight percent. In those instances where a water dilution study was made, the extrapolated values are derived from the resulting log viscosity/water dilution plots. With respect to those resoles which were not subjected to a water dilution study, the value for viscosity extrapolated to a water content of 12 weight percent is derived from a straight line drawn parallel to an established water dilution curve for a resole condensed at the same F/P ratio, and through the point corresponding to the initial viscosity and water content of the resole.

RUNS A THROUGH H (1) Preparation of Resoles A through H

These resoles, which are not of the invention, were prepared at an F/P ratio of 2.4 moles of formaldehyde per mole of phenol. Thus, in each preparation, the reactor (10 gallon capacity) was charged with 25 pounds of phenol and 48 pounds of a 40 weight percent aqueous solution of formaldehyde. In the preparation of Resoles A, B and C, the condensation was effected in the presence of sodium hydroxide (70 grams of NaOH in 175 grams of water); the respective reaction mixtures had a pH of 8.25, 8.35 and 8.25. The condensation catalyst used in the preparation of Resoles D, E and F was potassium hydroxide also added as an aqueous solution (113 grams of KOH in 175 grams of water); the pH of the respective reaction mixtures was 8.3. In the preparation of Resoles G and H, the condensation was effected in the presence of barium hydroxide monohydrate (160 grams), the reaction mixtures having a pH of 8.4. After heating to 75° C. (Resole A) or 65° C. (Resoles B-H), the reaction mixtures were allowed to exotherm to 100° C. at atmospheric pressure. The condensation reactions were then effected at about 100° C. for the respective reaction times given in Table III herein. After vacuum cooling to about 50° C., the alkaline condensates were treated while stirring with dilute sulfuric acid having a concentration from about 10 to about 14 weight percent, to bring the final pH of condensate to a value between about 6.0 and about 6.3. In those instances (Resoles C and E-H) where, after the initial treatment with sulfuric acid, the pH of the condensate fell below 6.0, adjustment to a pH within the stated final range was made by adding back additional condensation catalyst. Aqueous distillate was then removed from the neutralized reaction mixtures by vacuum stripping. Typical conditions at which the resoles were dehydrated include a temperature from about 40° to about 60° C. and a reduced pressure from about 26 to about 29 inches of mercury, for about 1 to about 3 hours. The weight of the respective aqueous distillates was from 27 to 30.5 pounds. The partially dehydrated liquid products are referred to herein as Resoles A through H. Their viscosity and water contents are given in Table III which also includes, where determined, their phenol and formaldehyde contents, and weight average molecular weights (GPC, $M_w$).

(2) Foaming Of Resoles A Through H

Following the above-described general foaming procedure, each of Resoles A through H was used as the resole component of Foam Formulation I (Table I). The results are given in Table III which follows.

reactor (10 gallon capacity) was charged with 25 pounds of phenol and 42 pounds of a 40 weight percent aqueous solution of formaldehyde. In the preparation of Resoles J, K, L and M, the condensation was effected in the presence of sodium hydroxide (70 grams of NaOH in 175 grams of water), the respective reaction mixtures having a pH of 8.4. The condensation catalyst used in the preparation of Resole O was potassium hydroxide also added as an aqueous solution (113 grams of KOH in 175 grams of water), the pH of the reaction mixture being 8.3. In the preparation of Resoles P and Q, the condensation was effected in the presence of barium hydroxide monohydrate (160 grams), the reaction mixtures having a pH of 8.4. After heating to 65° C., the respective reaction mixtures were allowed to exotherm to 100° C. at atmospheric pressure. The condensation reactions were then effected at about 100° C. for the respective reaction times given in Tables IV and V herein. After vacuum cooling to 50°-55° C., the alkaline condensates were treated while stirring with dilute sulfuric acid having a concentration from about 12 to about 16 weight percent, to bring the final pH of con- Table III

| | Formaldehyde/Phenol Mole Ratio = 2.40 | | | | | | | |
|---|---|---|---|---|---|---|---|---|
| Resole and Run No. | A | B | C | D | E | F | G | H |
| Condensation conditions: | | | | | | | | |
| F/P, mole/mole | 2.40 | 2.40 | 2.40 | 2.40 | 2.40 | 2.40 | 2.40 | 2.40 |
| Catalyst | NaOH | NaOH | NaOH | KOH | KOH | KOH | Ba(OH)$_2$ | Ba(OH)$_2$ |
| Temperature, °C. | 100 | 100 | 100 | 100 | 100 | 100 | 100 | 100 |
| Time, hours | 0.5 | 0.75 | 1.00 | 0.50 | 1.00 | 1.25 | 1.00 | 1.50 |
| Resole Product: | | | | | | | | |
| Phenol, weight % | 5.18 | 5.23 | 2.70 | 6.32 | 3.04 | 3.09 | — | — |
| HCHO, weight % | 12.12 | 11.92 | 11.37 | 12.41 | 11.70 | — | 12.18 | 11.35 |
| GPC, Mw | 510 | 473 | 1180 | 380 | 615 | 1660 | 559 | 1198 |
| Viscosity, cps. (25° C.) | 2625 | 2650 | 236,000 | 1100 | 18,600 | 40,500 | 3800 | 90,000 |
| Water content, wt. % | 7.3 | 10.6 | 4.0 | 10.5 | 7.8 | 10.4 | 9.5 | 7.8 |
| Phenolic Foam: Foam No. | A | B | C | D | E | F | G | H |
| Formulation | I | I | I | I | I | I | I | I |
| Total water in system, % | 7.3 | 10.6 | 6.8[1] | 10.5 | 7.8 | 10.4 | 9.5 | 7.8 |
| Density, pcf. | 1.84 | 2.37 | 3.53 | 1.52 | 3.23 | 2.16 | 2.34 | 4.04 |
| Compressive strength, parallel, psi. | — | — | — | — | — | — | 22.2 | 50.9 |
| Friability, 10 minutes, % wt. loss | 36.2 | — | — | 65.7 | — | — | 41.9 | 28.7 |
| Processability | OK | NG[2] | NG[2] | OK | NG[2] | NG[2] | NG[2] | OK |
| Punking | Yes | — | Yes | — | — | — | — | — |
| Overall Foam Rating[3] | UA | UA | UA | UA | UA | UA | UA | UA |

[1]Water added to resole prior to foaming to reduce viscosity to 45,000 cps. (25° C.).
[2]Not good because of stress cracks.
[3]UA = unacceptable.

Inspection of the results of Table III shows that, in each instance, the foam products derived from Resoles A through H were assigned an unacceptable rating ("UA") in that they did not exhibit the above-discussed processability and/or foam density criteria. In those instances (Foams A, D and H) where the foams did qualify for an acceptable processability or "OK" rating, the foam densities (1.84, 1.52 and 4.04, respectively) were outside of the target range of 1.90–3.70 pcf., and thus the foams were rated unacceptable. In view of the unsatisfactory foam performance exhibited by Resoles A through H, phenol/formaldehyde resoles which have been condensed at an F/P ratio of 2.4:1 are not within the scope of the present invention.

RUNS J THROUGH R

(1) Preparation of Resoles J–M and O–Q

These resoles, which also are not of the invention, were prepared at an F/P ratio of 2.1 moles of formaldehyde per mole of phenol. Thus, in each preparation, the densate to a value between about 6.0 and about 6.4. In those instances (Resoles L, M, P and Q) where, after the initial treatment with sulfuric acid, the pH of the condensate fell below 6.0, adjustment to a pH within the stated range was made by adding additional condensation catalyst. The neutralized condensates were then subjected to stripping to remove aqueous distillate. This was accomplished by vacuum stripping at 42°–50° C. and a reduced pressure from about 27.5–28 inches of mercury for about 0.5–2.5 hours, except that in the case of Resole P, dehydration was effected under reduced pressure without the application of heat due to severe foaming. The weight of the respective aqueous distillates was from 23 to 25.7 pounds. The remaining products, referred to herein as Resoles J–M, O, P and Q, were then cooled to room temperature. The viscosity and water content of the resoles are given in Tables IV and V which also set forth the weight percentages of free phenol and formaldehyde contained in some of the resoles, as well as weight average molecular weights (GPC, $M_w$) where determined, and viscosity values (centipoise at 25° C.) extrapolated to a water content of 12 weight percent.

(2) Preparation of Resole N

This resole is produced at a formaldehyde-to-phenol mole ratio of 2.09 using an aqueous solution of sodium hydroxide (dry basis, 0.608 pounds of NaOH per 100 pounds of phenol) as the condensation catalyst (pH of the reaction mixture is 8.1 to 8.3). The reaction mixture is heated to 75° C. under reduced pressure and is then allowed to exotherm to 85° C. with appropriate adjustment of pressure. The condensation reaction is then effected by holding the temperature and pressure at the preset conditions which include a temperature of 85° C.±1° C., for 2.5 hours. After cooling the reaction mixture to 50°–55° C., it is then neutralized with dilute sulfuric acid to a pH from 6.0 to 6.9. The neutralized condensate is then subjected to distillation at reduced pressure such that about 0.967 pound of aqueous distillate per pound of phenol is separated. This resole is referred to herein as Resole N and is further characterized in Table IV.

(3) Preparation of Resole R

This resole is of commercial grade and is produced at a formaldehyde-to-phenol ratio of about 2.0, employing barium hydroxide monohydrate as the condensation catalyst. The condensation reaction is usually effected at a temperature of about 85° C. for 2 to 2.5 hours. The alkaline condensate is neutralized with dilute sulfuric acid to a pH within the range from about 5.6 to about 6.4. The neutralized reaction mixture is subjected to distillation to separate aqueous distillate under reduced pressure. This particular resin is referred to herein as Resole R and, as tested herein, had a viscosity of 4400 centipoise (25° C.) and a water content of 7.7 weight percent.

(4) Foaming of Resoles J Through R

Following the above-described general foaming procedure, each of Resoles J through R was used as the resole component of Foam Formulation I. In addition, Resole K was also tested as the resole component of Foam Formulation III (Run K-1), and Resoles P and R were also evaluated as the resole component of Foam Formulation II (Runs P-1 and R-1). The results are given in Tables IV and V which follow.

Table IV

| | Formaldehyde/Phenol Mole Ratio = 2.1 | | | | | |
|---|---|---|---|---|---|---|
| Resole No. | J | K | K | L | M | N |
| Run No. | J | K | K-1 | L | M | N |
| Condensation Conditions: | | | | | | |
| F/P, mole/mole | 2.1 | 2.1 | 2.1 | 2.1 | 2.1 | 2.09 |
| Catalyst | NaOH | NaOH | NaOH | NaOH | NaOH | NaOH |
| Temperature, °C. | 100 | 100 | 100 | 100 | 100 | 85 |
| Time, hours | 1.25 | 1.25 | 1.25 | 1.50 | 1.75 | 2.5 |
| Resole Product: | | | | | | |
| Phenol, weight % | — | — | — | — | — | 10.23 |
| HCHO, weight % | — | — | — | — | — | 8.72 |
| GPC, Mw | — | 1618 | 1618 | — | — | — |
| Viscosity, cps. (25° C.) | 22,350[1] | 72,000 | 72,000 | 31,600[2] | 360,000 | 5220 |
| Water Content, wt. % | 12.7 | 11.2 | 11.2 | 13.4 | 10.6 | 6.0 |
| Viscosity extrapolated to 12% H$_2$O | 26,000 | 48,000 | 48,000 | 48,000 | 300,000 | 500 |
| Phenolic Foam: Foam No. | J | K | K-1 | L | — | N |
| Formulation | I | I | III | I | — | I |
| Total water in system, % | 12.7 | 11.1 | 11.1 | 13.4 | — | 6.0 |
| Density, pcf. | 8.33 | 5.05 | 3.96 | 4.67 | TOO | 1.26 |
| Compressive strength, parallel, psi. | — | — | 39.9 | — | VISCOUS TO | — |
| Friability, 10 minutes, % wt. loss | — | 13.0 | 20.4 | — | FOAM | 37.0 |
| Processability | NG | NG[3] | NG | NG | NG | NG |
| Punking | — | — | — | — | — | — |
| Overall Foam Rating[4] | UA | UA | UA | UA | (UA) | UA |

[1]After diluting resole to a water content of 12.7% to lower initial viscosity (169,000 cps. at 8.30% water).
[2]After diluting resole to a water content of 13.4% to lower initial viscosity (150,800 cps. at 9.10% water).
[3]Although voids were mild, processability was rated "NG" because of low rise.
[4]UA = unacceptable.

Table V

| | Formaldehyde/Phenol Mole Ratio = 2.1 | | | | | |
|---|---|---|---|---|---|---|
| Resole No. | O | P | P | Q | R | R |
| Run No. | O | P | P-1 | Q | R | R-1 |
| Condensation Conditions: | | | | | | |
| F/P, mole/mole | 2.1 | 2.1 | 2.1 | 2.1 | 2.0 | 2.0 |
| Catalyst | KOH | Ba(OH)$_2$ | Ba(OH)$_2$ | Ba(OH)$_2$ | Ba(OH)$_2$ | Ba(OH)$_2$ |
| Temperature, °C. | 100 | 100 | 100 | 100 | 85 | 85 |
| Time, hours | 0.5 | 0.5 | 0.5 | 1.50 | 2–2.5 | 2–2.5 |
| Resole Product: | | | | | | |
| Phenol, weight % | 7.39 | — | — | 4.53 | — | — |
| HCHO, weight % | 9.05 | 8.67 | 8.67 | 7.89 | — | — |
| GPC, Mw | 365 | 1054 | 1054 | 2004 | — | — |
| Viscosity, cps. (25° C.) | 392 | 505 | 505 | 1,480,000 | 4400 | 4400 |

Table V-continued

| | Formaldehyde/Phenol Mole Ratio = 2.1 | | | | | |
|---|---|---|---|---|---|---|
| Water content, wt. % | 14.1 | 12.6 | 12.6 | 7.1 | 7.7 | 7.7 |
| Viscosity extrapolated to 12% H₂O | 600 | 560 | 560 | >100,000 | 930 | 930 |
| Phenolic Foam: Foam No. | O | P | P-1 | — | R | R-1 |
| Formulation | I | I | II | — | I | II |
| Total water in system, % | 14.1 | 12.6 | 14.3¹ | — | 7.7 | 9.5² |
| Density, pcf. | 1.71 | 1.51 | 1.71 | TOO | 1.43 | 2.41 |
| Compressive strength, parallel, psi. | 11.0 | 9.0 | 10.7 | VISCOUS TO | — | — |
| Friability, 10 minutes, % wt. loss | 67.8 | 98.0 | 82.0 | FOAM | — | — |
| Processability | OK | OK | NG | NG | NG | NG |
| Punking | NO | NO | YES | — | — | — |
| Overall Foam Rating³ | UA | UA | UA | (UA) | UA | UA |

¹Based on actual analysis of Resole P after dilution with 2 parts by weight of water phr. in separate determination; resole viscosity at 14.3 weight percent water = 371 cps. (25° C.).
²Based on actual analysis of Resole R after dilution with 2 parts by weight of water phr. in separate determination; resole viscosity at 9.5 weight percent H₂O = 2072 cps. (25° C.)
³UA = unacceptable.

Inspection of the results of Tables IV and V shows that in each instance, Resoles J through R provided foam to which an unacceptable rating was assigned. The unacceptable rating was assigned because of either poor processability (Resoles J–N, Q and R) or a density of less than 1.90 pcf. (Resoles O and P). Variation in the foam formulation as in the formation of Foams K-1, P-1 and R-1 did not alter the initial rating.

FIG. 1 of the accompanying drawings includes a plot of log viscosity as a function of water content for each of Resoles J through N. These particular plots are labeled J, K, L, M and N, respectively, and are based on the following measurements of viscosity at the indicated water content, as determined in respective water dilution studies.

Table VI

| | Water Dilution Of Resoles | |
|---|---|---|
| Resole | Viscosity (cps. at 25° C.) | Water Content (weight %) |
| J | 169,000 | 8.3 |
| | 22,350 | 12.7 |
| | 17,660 | 14.3 |
| | 11,960 | 16.6 |
| K | 72,000 | 11.2 |
| | 40,000 | 12.1 |
| | 28,250 | 13.0 |
| | 23,500 | 13.9 |
| | 18,300 | 14.7 |
| L | 150,800 | 9.1 |
| | 31,600 | 13.4 |
| | 22,300 | 15.0 |
| M | 360,000 | 10.6 |
| | 166,000 | 17.2 |
| N | 5220 | 6.0 |
| | 2520 | 6.9 |
| | 2040 | 7.9 |
| | 1560 | 8.8 |
| | 1100 | 9.7 |

As shown in FIG. 1, none of the plots of log viscosity against water content for Resoles J, K, L, M and N, falls within the area defined by points (i)–(iv). Thus, consistent with the unacceptable rating assigned to phenolic foam produced therewith, the viscosity/water relationship of these resoles was such to indicate that Resoles J through N were not advanced to the extent necessary to provide foam having acceptable processability as well as low friability and high compressive strength within a foam density range of 1.90-3.70 pcf.

Although not shown in FIG. 1, the respective viscosity/water relationship for Resoles O through R also do not fall within the area defined by points (i)–(iv), as indicated by the following data.

Table VII

| | Water Dilution Of Resoles | |
|---|---|---|
| Resole | Viscosity (cps. at 25° C.) | Water Content (weight %) |
| O | 392 | 14.1 |
| | 325 | 15.0 |
| | 307 | 15.8 |
| | 250 | 16.7 |
| | 209 | 17.5 |
| P | 505 | 12.6 |
| | 425 | 13.4 |
| | 371 | 14.3 |
| | 328 | 15.2 |
| | 273 | 16.0 |
| Q | 1,480,000 | 7.1 |
| | >100,000¹ | 12.0¹ |
| R | 4400 | 7.7 |
| | 2880 | 8.6 |
| | 2072 | 9.5 |
| | 1540 | 10.4 |
| | 1240 | 11.3 |

¹Resole Q was so viscous that a water dilution study was not made therefor. The indicated viscosity of greater than 100,000 centipoise at 12 weight percent water is an extrapolated value.

EXAMPLES 1–7

(A) Preparation of Resoles I Through VII

Each of these resoles, which are within the invention, was prepared at an F/P ratio of 2.1 moles of formaldehyde per mole of phenol. Resoles I, VI and VII were prepared in a 10-gallon capacity reactor whereas Resoles II, III, IV and V were produced on a larger scale (200-gallon capacity reactor). Further details are as follows:

(I) Preparation of Resoles I, VI and VII

In each preparation, the reactor was charged with 25 pounds of phenol and 42 pounds of a 40 weight percent aqueous solution of formaldehyde. The catalysts employed were: sodium hydroxide (Resole I; 70 grams NaOH in 175 grams of water); potassium hydroxide (Resole VI; 113 grams of KOH in 175 grams of water); and barium hydroxide monohydrate (Resole VII; 160 grams). The pH of the reaction mixtures were 8.35, 8.4 and 8.5, respectively. The reaction mixtures were heated to 65° C., were allowed to exotherm to 100° C. and were then held at 100° C. for one hour (Resoles I and VII) and 1.25 hours (Resole VI). Thereafter, the alkaline condensates were vacuum cooled to 53°–50° C. In the preparation of Resoles I and VI, neutralization to a pH of 6.0 and 6.1, respectively, was effected using dilute sulfuric acid (about 18 weight percent). In the preparation of Resole VII, the condensate was also treated with dilute sulfuric acid, followed by adjustment of the resulting pH (4.8) to a final pH of 6.2 by adding back barium hydroxide. The neutralized condensates were then subjected to distillation (47°–49° C./27–27.5 inches of mercury) for about 1–1.5 hours or until about 24 pounds of aqueous distillate had been collected. The remaining products are referred to herein as Resoles I, VI and VII.

(2) Preparation of Resoles II Through V

In each of these preparations, the reactor was charged with 625 pounds of phenol and 1050 pounds of a 40 weight percent aqueous solution of formaldehyde. The condensation catalyst was sodium hydroxide added as an aqueous solution. In the preparation of Resoles II-IV, the catalyst was added in an amount sufficient to provide about 0.62 pounds of NaOH per 100 pounds of phenol. In the preparation of Resole V, about 0.58 pound of NaOH per 100 pounds of phenol was used.

After the indicated reaction periods, the reaction mixtures were vacuum cooled to about 50° C., and were then neutralized with dilute sulfuric acid, adding back sodium hydroxide as required (Resoles IV and V), to adjust the final pH to 6.15, 6.0, 5.8 and 5.9, respectively. The neutralized condensates were then dehydrated by vacuum distillation (44°–57° C./26–27.5 inches of mercury) until 600–635 pounds of aqueous distillate had been collected. The partially dehydrated reaction products are referred to herein as Resoles II, III, IV and V.

(B) Foaming of Resoles I Through VII

Following the above-described general foaming procedure, each of Resoles I through VII was used as the resole component of Foam Formulation I. In addition Resoles I and VI were also tested as the resole components of Foam Formulations II and III, respectively (Examples 2-1 and 6-1). The results are given in Table VIII which also summarizes the condensation conditions at which the resoles were prepared, the resole viscosity and water contents and, where determined, phenol and formaldehyde contents as well as weight average molecular weight values (GPC, $M_w$). Table VIII follows.

Table VIII

| | Formaldehyde/Phenol Mole Ratio = 2.1 | | | | | | | | |
|---|---|---|---|---|---|---|---|---|---|
| Example No. | 1 | 2 | 2-1 | 3 | 4 | 5 | 6 | 6-1 | 7 |
| Resole No. | I | II | II | III | IV | V | VI | VI | VII |
| Condensation Conditions: | | | | | | | | | |
| F/P, mole/mole | 2.1 | 2.1 | 2.1 | 2.1 | 2.1 | 2.1 | 2.1 | 2.1 | 2.1 |
| Catalyst | NaOH | NaOH | NaOH | NaOH | NaOH | NaOH | KOH | KOH | Ba(OH)$_2$ |
| Temperature, °C. | 100 | 84 | 84 | 85 | 85 | 85 | 100 | 100 | 100 |
| Time, hours | 1.00 | 4.25 | 4.25 | 4.25 | 4.5 | 4.75 | 1.25 | 1.25 | 1.00 |
| Resole Product: | | | | | | | | | |
| Phenol, weight % | 5.34 | 3.19 | 3.19 | 3.62 | — | — | 3.19 | 3.19 | — |
| HCHO, weight % | 9.99 | 7.28 | 7.28 | 9.11 | — | — | 19.73 | 19.73 | 8.44 |
| GPC, Mw | 625 | 529 | 529 | 723 | — | — | 913 | 913 | 609 |
| Viscosity, cps. (25° C.) | 8600 | 25,750 | 25,750 | 46,000 | 55,200 | 15,660 | 14,840 | 14,840 | 3675 |
| Water content, wt. % | 9.2 | 6.2 | 6.2 | 8.8 | 7.2 | 11.7 | 13.5 | 13.5 | 10.8 |
| Viscosity extrapolated to 12% H$_2$O | 3600 | 3000 | 3000 | 10,000 | 7500 | 11,700 | 20,000 | 20,000 | 2850 |
| Phenolic Foam: Foam No. | 1 | 2 | 2-1 | 3 | 4 | 5 | 6 | 6-1 | 7 |
| Formulation | I | I | II | I | I | I | I | III | I |
| Total water in system, % | 9.2 | 6.2 | 8.1[1] | 8.8 | 7.2 | 11.7 | 13.5 | 13.5 | 10.8 |
| Density, pcf. | 2.08 | 2.26 | 2.19 | 3.30 | 3.23 | 3.48 | 3.67 | 3.07 | 2.32 |
| Compressive strength, parallel, psi. | 19.8 | 28.5 | 25.8 | 48.2 | 51.7 | 53.3 | 60.6 | 34.0 | 23.3 |
| Friability, 10 minutes, % wt. loss | 28.0 | 3.2 | 19.4 | 16.0 | 14.8 | 18.6 | 15.8 | 24.2 | 39.1 |
| Processability | OK | OK | OK | OK | OK | OK | OK | OK | OK |
| Punking | Yes | Yes | No | No | — | — | No | No[3] | No |
| Overall Foam Rating[2] | 4 | 6 | 7 | 5 | at least 4 | at least 4 | 5 | 5 | UA |

[1]Based on actual analysis of Resole II after dilution with 2 parts by weight of water phr. in separate determination; resole viscosity at 8.1 weight percent water = 10,400 cps. (25° C.)
[2]As previously defined herein.
[3]Modified test, as previously described herein.

The pH of the respective condensates was 8.3, 8.4, 8.6 and 8.45. In the preparation of Resole II, the reactor was set for vacuum reflux at 15 inches of mercury and the reaction mixture was brought to a temperature of 65° C. by means of a steam jacket which took about 6 minutes. Thereafter, the reactor mixture (Resole II) was allowed to exotherm; the temperature was controlled at 84° C. by vacuum refluxing (15.25–14.75 inches of mercury) for a reaction time of 4.25 hours. In the preparation of Resoles III, IV and V, the condensation reactions were carried out in substantially the same manner at 85° C.±1° C. for reaction times of 4.25, 4.5 and 4.75 hours.

The results of Table VIII show that resoles I through VII of the invention provided respective foams which were free of deleterious void formation and severe stress cracks and were thus assigned a processability rating of "OK". Further, in each instance, foam density was within the 1.90-3.70 pcf. range, and compressive strength was at least about 20 psi. Except for Foam 7 produced with barium hydroxide-catalyzed Resole VII, the friability resistance was also less than 35 percent weight loss. As further shown in Table VIII, Foams 1 and 3 to 6-1 qualified for a rating of 4 or 5 depending upon whether they also exhibited a low punking extent (0-5%) in the above-described punking test. Foams 2 and 2-1 qualified for a rating of 6 and 7, respectively, inasmuch as their compressive strength was at least 25 psi. and their friability was less than 25 weight percent within the preferred foam density of 2.0–3.0 pcf., Foam 2-1 qualifying for a rating of 7 because of its improved resistance to punking.

FIG. 1 of the accompanying drawings includes respective curves based on a plot of log viscosity as a function of water content for each of Resoles I, II and III. These particular plots are correspondingly labeled I, II and III and are based on the above-described study of change in viscosity upon dilution with water of these respective resoles. As shown in FIG. 1, these particular curves fall within the area defined by points (i)–(iv). The viscosity/water measurements which form the basis for lines labeled I, II and III are given in the following Table IX which also includes the viscosity for Resoles IV through VII at the indicated water contents.

Table IX

Water Dilution of Resoles

| Resole | Viscosity (cps. at 25° C.) | Water (weight %) |
|---|---|---|
| I | 8600 | 9.2 |
|  | 5850 | 10.1 |
|  | 4700 | 11.0 |
|  | 3780 | 11.9 |
|  | 2960 | 12.8 |
| II | 25,750 | 6.2[1] |
|  | 13,900 | 7.1 |
|  | 10,400 | 8.1 |
|  | 7,080 | 9.0 |
|  | 5240 | 9.9 |
| III | 46,000 | 8.8 |
|  | 25,750 | 9.7 |
|  | 16,500 | 10.6 |
|  | 12,000 | 11.5 |
|  | 9250 | 12.4 |
| IV | 55,200 | 7.2 |
|  | 22,500 | 9.0 |
|  | 11,400 | 10.8 |
| V | 15,660 | 11.7 |
|  | 11,700[2] | 12.0[2] |
| VI | 14,840 | 13.5 |
|  | 12,100 | 14.4 |
|  | 9,330 | 15.2 |
|  | 8850 | 16.1 |
|  | 6930 | 16.9 |
| VII | 3675 | 10.8 |
|  | 3135 | 11.7 |
|  | 2675 | 12.6 |
|  | 2012 | 13.4 |
|  | 1700 | 14.3 |

[1]Average of two water analyses (5.9 and 6.4%).
[2]A water dilution study for Resole V was not made; the indicated viscosity of 11,700 at 12 weight percent water is an extrapolated value.

Although not shown in FIG. 1, it is clear from the measurements given in Table IX for Resoles IV, V and VI that either the values for their initial viscosity and water content fall within the area defined by straight line interconnection in series of points (i)–(iv) or that respective plots of log viscosity against water content fall within, or extend into, the defined area which is consistent with the excellent foam performance of Resoles IV–VI. A somewhat anomalous result was obtained with barium hydroxide-catalyzed Resole VII the log viscosity/water relationship of which just falls within the area defined by points (i)–(iv) of FIG. 1. Thus, Foam 7 derived from Resole VII had acceptable processability, a density of 2.32 pcf., a compressive strength of 23.3 psi. and also had a very low punking extent. However, because its friability was 39.1 percent weight loss (and thus was higher than the target of less than 35 percent), Foam 7 was given an unacceptable rating notwithstanding the fact that the overall foam performance of Resole VII was otherwise good. This higher friability indicates that Resole VII may have been underadvanced even though the initial F/P mole ratio of 2.1 should have been adequate as compared to results achieved using sodium and potassium hydroxides as the condensation catalyst at the same F/P mole ratio of 2.1. To be considered, however, is the fact that barium hydroxide, being a weaker base, is less effective as a catalyst than the alkali metal hydroxides and is also less soluble in the reaction mixture. Thus, in view of the results obtained with Resole VII, it is recommended that, in condensing phenol and formaldehyde at an F/P ratio of 2.1 using barium hydroxide as the catalyst, the severity of the reaction conditions should be increased beyond that applied in the preparation of Resole VII such as, for example, by effecting the condensation reaction for a longer reaction time such as 1.25 hours (instead of one hour) when operating at a temperature of about 100° C.

EXAMPLES 8–13

(A) Preparation of Resoles VIII Through XIII

Each of these resoles, which are within the invention, was prepared at an F/P ratio of about 2.1 moles of formaldehyde per mole of phenol. Resoles VIII, IX, XII and XIII were prepared in a 200-gallon capacity reactor whereas Resole XI was prepared on a smaller scale (10 gallon capacity reactor). Resole X was prepared by "bodying" of a previously prepared resole of the grade described hereinabove as Resole N. Further details are given below.

(1) Preparation of Resole IX

To a 200 gallon reactor there were charged 625 pounds of phenol (6.65 pound-moles) and 1050 pounds of a 40 weight percent aqueous solution of formaldehyde (14 pound-moles HCHO); the pH of the mixture was 3.35. The reactor was set for vacuum reflux at 24 inches of mercury. The reactor was then charged with a 28.5 weight percent aqueous solution of sodium hydroxide to provide a catalyst concentration of 0.62 parts by weight of sodium hydroxide per 100 parts by weight of phenol. The pH of the reaction mixture was 8.35. The reactor was then set for vacuum reflux at 15 inches of mercury and was heated by means of a steam jacket to 65° C. which took about 7 minutes. Thereafter, the reaction mixture was allowed to exotherm and the reaction temperature was controlled by vacuum reflux (14.75 inches of mercury) until the temperature reached 84.5° C. which took about 17 minutes. Refluxing of the reaction mixture was continued for 4.25 hours at 84° C./14.75 inches of mercury. At the end of this period, the condensate was vacuum cooled to 50° C. The pH (7.4) of the reaction mixture was lowered to 6.25 by the addition thereto with stirring over a 10 minute period of 19 pounds of a 16 weight percent aqueous solution of sulfuric acid. At 50° C., a vacuum was applied (26.5 inches Hg). The mixture was then dehydrated by heating for 68 minutes at a temperature from 49° C. to 53° C. at a reduced pressure of 26.5 to 26.8 inches of mercury until 610 pounds of aqueous distillate was removed. A sample of the residual product had a viscosity of 15,000 centipoise and a water content of 8.4 weight percent. The product was stripped further at 44° C. to a viscosity of 17,200 centipoise and a water content of 7.5 weight percent. The product was then cooled to 40° C. and discharged from the reactor. A total of 635 pounds of aqueous distillate had been collected and the resole product, referred to herein as Resole IX, weighed 1040 pounds.

(2) Preparation of Resoles VIII, XII and XIII

These resoles were prepared in substantially the same manner as described above for Resole IX. Thus, in each instance, the reactor was charged with 625 pounds of phenol and 1050 pounds of a 40 weight percent aqueous solution of formaldehyde, and aqueous sodium hydroxide was used as the catalyst in an amount sufficient to provide about 0.62 parts by weight of NaOH/100 parts by weight of phenol. As in the case of Resole IX, the condensation reactions were effected by vacuum refluxing (14–15 inches Hg.) at the reaction temperatures and times given in Table X hereinbelow. Neutralization of the alkaline condensates was effected by the addition of dilute sulfuric acid to respective pH values of 6.1, 6.25 and 6.2. Aqueous distillate was removed substantially as described for Resole IX adding back water to adjust water content, as required. The aqueous distillates weighed 670, 635 and 625 pounds, respectively. The resole products weighed 1067, 1040 and 1055 pounds, respectively, and are referred to herin as Resoles VIII, XII and XIII.

(3) Preparation of Resole XI

In this preparation, the reactor was charged with 25 pounds of phenol, 42 pounds of an aqueous solution of formaldehyde, and sodium hydroxide catalyst (70 grams of NaOH in 175 grams of water). The reaction mixture (pH=8.4) was heated to 75° C. and was then refluxed at 83°-86° C. under vacuum (14–15 inches of mercury) for a reaction time of 4 hours. After cooling under vacuum to 50° C., the alkaline condensate was neutralized to a pH of 6.2 by the addition thereto of dilute sulfuric acid (55 grams of concentrated $H_2SO_4$ in 290 grams of water). The neutralized condensate was then subjected to vacuum distillation (51° C./27 inches of mercury) until 24.7 pounds of aqueous distillate had been collected. The remaining product (36.5 pounds) is designated herein as Resole XI.

(4) Preparation of Resole X

In this preparation, the reactor was charged with 600 pounds of phenol and 1000 pounds of a 40 weight percent aqueous solution of formaldehyde, corresponding to an F/P ratio of about 2.09 moles of formaldehyde per mole of phenol, and 7.3 pounds of a 50 weight percent solution of sodium hydroxide. The reaction mixture (pH=8.25) was heated to 75° C., was allowed to exotherm and was then refluxed at 85° C. under vacuum for 2 hours. After vacuum cooling to 50°-55° C., the mixture was neutralized with dilute sulfuric acid to a pH of 6.85. Separation of aqueous distillate (596 pounds) was effected over a period of about 5 hours at 40°-70° C./28-29 inches of mercury. The remaining product (971 pounds) had a viscosity of 3320 centistokes. A 45 pound portion of this product was "bodied" by heating at 65° to 80° C. for about 12 hours. After this prolonged heating period, the product was dehydrated under vacuum (60° C./26.5-27 inches of mercury) over a period of about 0.5 hour, thereby removing about 235 grams of aqueous distillate. The resultant product is referred to herein as Resole X.

(B) Foaming of Resoles VIII Through XIII

Following the above-described general foaming procedure, each of Resoles VIII through XIII was employed as the resole component of Foam Formulation I. Resole XI was also tested in Example 11-1 as the resole component of Foam Formulation III. The results are given in Table X which also summarizes the condensation reaction conditions at which the resoles were prepared, the resole viscosity and water contents and, where determined, phenol and formaldehyde contents and values for the weight average molecular weights (GPC, Mw). Table X follows.

Table X

| Formaldehyde/Phenol Mole Ratio = 2.1 | | | | | | | |
|---|---|---|---|---|---|---|---|
| Example No. | 8 | 9 | 10 | 11 | 11-1 | 12 | 13 |
| Resole No. | VIII | IX | X | XI | XI | XII | XIII |
| Condensation Conditions: | | | | | | | |
| F/P, mole/mole | 2.1 | 2.1 | 2.09 | 2.1 | 2.1 | 2.1 | 2.1 |
| Catalyst | NaOH | NaOH | NaOH | NaOH | NaOH | NaOH | NaOH |
| Temperature, °C. | 83.5–85 | 84 | 85 | 83–86 | 83–86 | 84 | 85 |
| Time, hours | 4.00 | 4.25 | 2[1] | 4.00 | 4.00 | 4.25 | 4.25 |
| Resole Product: | | | | | | | |
| Phenol, weight % | — | — | — | 3.89 | 3.89 | 3.9 | 3.0 |
| HCHO, weight % | — | 7.1 | — | 6.81 | 6.81 | 6.8 | 7.3 |
| GPC, Mw | 537 | 543 | — | — | — | 586 | 641 |
| Viscosity, cps. (25° C.) | 13,260 | 22,300 | 36,100 | 21,450[2] | 21,450[2] | 28,600 | 44,750 |
| Water content, wt % | 8.1 | 7.5 | 7.1 | 8.8 | 8.8 | 8.2 | 8.5 |
| Viscosity extrapolated to 12% $H_2O$ | 3900 | 4500 | 6200 | 6700 | 6700 | 6900 | 7100 |
| Phenolic Foam: Foam No. | 8 | 9 | 10 | 11 | 11-1 | 12 | 13 |
| Formulation | I | I | I | I | III | I | I |
| Total water in system, % | 8.1 | 7.5 | 7.0 | 8.8 | 8.8 | 8.2 | 8.5 |
| Density, pcf. | 2.59 | 2.87 | 2.19 | 2.51 | 2.04 | 2.93 | 2.89 |
| Compressive strength, parallel, psi. | 37.1 | 38.4 | 28.0 | 33.8 | 25.5 | 49.3 | 43.0 |
| Friability, 10 minutes, % wt. loss | 16.0 | 13.9 | 16.8 | 17.7 | 21.6 | 13.6 | 12.6 |
| Processability | OK | OK | OK | OK | OK | OK | OK |
| Punking | No | No | No | [3] | No | No | No |

Table X-continued

| Formaldehyde/Phenol Mole Ratio = 2.1 | | | | | | |
|---|---|---|---|---|---|---|
| Overall Foam Rating | 7 | 7 | 7 | 3 | 7 | 7 | 7 |

[1] Plus further advancement by "bodying" of neutralized condensate.
[2] The resole as prepared was highly viscous and thus 4 parts of water were added to bring the total water content to 8.8% and to reduce the viscosity to 21,450 cps. (25° C.).
[3] Inasmuch as the water content of Formulations I and III is the same, Foam 11 would be expected to qualify for the same punking rating of "No" for which Foam 11-1 qualified. Thus, Foam 11-1 has a rating of at least 6 and probably 7.

The results of Table X show that Resoles VIII through XIII provided respective foams which were free of deleterious defects such as excessive void formation and stress cracks, and were thus assigned a processability rating of "OK". Further, each resole provided a foam density within the preferred range of 2.0 to 3.0 pcf. and, within this range, a friability of less than 25 percent weight loss and a compressive strength greater than 25 psi. In addition to this excellent overall combination of mechanical properties, Foams 8-10, 12 and 13 derived from Resoles VIII-X, XII and XIII, also had low punking extents of 0 to 5 percent and thus qualified for a non-punking rating in the above-described punking test.

FIG. 1 of the accompanying drawings includes respective curves based on a plot of log viscosity as a function of water content for each of Resoles X and XIII. These plots are correspondingly labeled X and XIII and are based on the above-described study of change in viscosity upon dilution with water of these respective resoles. As shown, these particular plots fall within the area defined by points (i)–(iv). They also fall within the area contained within the lines interconnecting previously defined points (a)–(e) which area covers the preferred viscosity/water relationship of those resoles of the invention which have been initially condensed at an F/P ratio of at least 1.9 and no more than 2.2. As further shown in FIG. 1, the average molecular weight of previously described Resole III, as reflected by its viscosity/water relationship, is also within the preferred area defined by points (a)–(e). The viscosity/water measurements which form the basis of lines labeled X and XIII of FIG. 1 are given in the following Table XI which also includes the viscosity for Resoles VIII, IX, XI and XII at the indicated water contents.

Table XI

| | Water Dilution of Resoles | |
|---|---|---|
| Resole | Viscosity (cps. at 25° C.) | Water Content (weight, %) |
| VIII | 13,260 | 8.1 |
|  | 3900[1] | 12.0[1] |
| IX | 22,300 | 7.5 |
|  | 4500[2] | 12.0[2] |
| X | 36,100 | 7.1 |
|  | 21,600 | 8.9 |
|  | 10,020 | 10.6 |
|  | 6370 | 12.3 |
| XI | 219,600 | 4.5 |
|  | 21,450 | 8.8 |
| XII | 28,600 | 8.2 |
|  | 16,780 | 9.1 |
|  | 13,500 | 10.0 |
|  | 11,020 | 10.9 |
|  | 7750 | 11.8 |
| XIII | 44,750 | 8.5 |
|  | 19,200 | 9.4 |
|  | 13,100 | 10.3 |
|  | 9400 | 11.3 |
|  | 5900 | 12.1 |

[1] A water dilution study for Resole VIII was not made; the indicated viscosity of 3900 centipoise at 12 weight percent water is an extrapolated value.
[2] A water dilution study for Resole IX was not made; the indicated viscosity of 4500 centipoise at 12 weight percent water is an extrapolated value.

Although not shown in FIG. 1, it is clear from the measurements given in Table XI for Resoles VIII, IX, XI and XII that either the values for their initial viscosity and water content fall within the area defined by straight line interconnection in series of points (i)–(iv) or that respective plots of their viscosity on a logarithmic scale as a function of water content fall within, or extend into, the defined area, consistent with the overall excellent foam performance of these resoles of the invention.

RUNS S THROUGH W (1) Preparation of Resoles S through W

These resoles, which are not of the invention, were prepared at an F/P ratio of 1.75 moles of formaldehyde per mole of phenol. Thus, in each preparation, the reactor (10 gallon capacity) was charged with 25 pounds of phenol and 34.9 pounds of a 40 weight percent aqueous solution of formaldehyde. In the preparation of Resoles S, T and U, the condensation was effected in the presence of sodium hydroxide (70 grams of NaOH in 175 grams of water); the respective reaction mixtures had a pH of 8.35, 8.5, and 8.5. The condensation catalyst used in the preparation of Resole V was potassium hydroxide also added as an aqueous solution (113 grams of KOH in 175 grams of water); the pH of the reaction mixture was 8.4. In the preparation of Resole W, the condensation was effected in the presence of barium hydroxide monohydrate (160 grams), the reaction mixture having a pH of 8.4. After heating to 65° C., the respective reaction mixtures were allowed to exotherm to 100° C. at atmospheric pressure. The condensation reactions were then effected at 100° C. for the respective reaction times given in Table XII herein. After vacuum cooling to 50°-55° C., the alkaline condensates were treated while stirring with dilute sulfuric acid to bring the final pH of the condensates to a value between about 6.0 and about 6.4. Aqueous distillate (19.6-21.4 pounds) was removed from the respective neutralized reaction mixtures by vacuum stripping (40°-50° C./27-28 inches Hg). The respective products are referred to herein as Resoles S, T, U, V and W.

(2) Foaming of Resoles S Through W

Following the above-described general foaming procedure, each of these resoles was employed as the resole component of Foam Formulation I. The results are given in Table XII which also summarizes the condensation reaction conditions at which the resoles were prepared, as well as the resole viscosity, water, phenol and formaldehyde contents and values for weight average molecular weight (GPC, Mw). Table XII follows.

Table XII

| Formaldehyde/Phenol Mole Ratio = 1.75 | | | | | |
|---|---|---|---|---|---|
| Resole and Run No. | S | T | U | V | W |
| Condensation Conditions: | | | | | |
| F/P, mole/mole | 1.75 | 1.75 | 1.75 | 1.75 | 1.75 |
| Catalyst | NaOH | NaOH | NaOH | KOH | Ba(OH)$_2$ |
| Temperature, °C. | 100 | 100 | 100 | 100 | 100 |
| Time, hours | 0.75 | 0.83 | 1.50 | 0.50 | 0.75 |
| Resole Product: | | | | | |
| Phenol, weight % | 5.38 | 7.38 | 3.36 | 8.78 | 11.28 |
| HCHO, weight % | 4.09 | 4.18 | 4.59 | 5.32 | 4.49 |
| GPC, Mw | 500 | 546 | 1706 | 1575 | 516 |
| Viscosity, cps. (25° C.) | 5750 | 6830 | 308,400 | 1668 | 2820 |
| Water content, wt. % | 8.4 | 9.2 | 13.7 | 9.1 | 10.4 |
| Viscosity extrapolated to 12% H$_2$O | 2500 | 2850 | 400,000 | 690 | 1500 |
| Phenolic Foam: Foam No. | S | T | U | V | W |
| Formulation | I | I | I | I | I |
| Total water in system, % | 8.4 | 9.2 | 13.7 | 9.1 | 10.4 |
| Density, pcf. | 1.61 | 1.41 | TOO | 1.00 | 1.65 |
| Compressive strength, parallel, psi. | 18.1 | — | VISCOUS | — | 12.7 |
| Friability, 10 minutes, % wt. loss | 32.9 | — | FOAM | — | — |
| Processability | NG | NG | NG | OK | NG |
| Punking | No | — | — | Yes | Yes |
| Overall Foam Rating[1] | UA | UA | (UA) | UA | UA |

[1]UA = unacceptable.

As shown by the results of Table XII, in each instance, Resoles S through W provided foam to which an unacceptable rating was assigned either because of poor processability, too high a viscosity to foam (Resole U) or because the density of the foam product was too low (Foam V derived from Resole V), that is, the foam density was less than 1.90 pcf.

FIG. 2 of the accompanying drawings includes a plot of log viscosity as a function of water content for each of Resoles S, T and U. These particular plots are labeled S, T and U, respectively, and are based on the measurements of resole viscosity at the water contents given in the following Table XIII which also includes the results of a similar water dilution study for Resoles V and W.

Table XIII

| Water Dilution of Resoles | | |
|---|---|---|
| Resole | Viscosity (cps. at 25° C.) | Water (weight %) |
| S | 5750 | 8.4 |
|   | 4015 | 9.3 |
|   | 3095 | 10.2 |
|   | 2405 | 11.1 |
|   | 2142 | 12.0 |
| T | 6380 | 9.2 |
|   | 5020 | 10.1 |
|   | 3844 | 11.0 |
|   | 3168 | 12.0 |
|   | 2380 | 12.8 |
| U | 308,400 | 13.7 |
|   | 237,200 | 15.4 |
|   | 154,000 | 17.9 |
|   | 122,400 | 20.3 |
| V | 1668 | 9.1 |
|   | 1163 | 10.0 |
|   | 940 | 10.9 |
|   | 735 | 11.8 |
|   | 620 | 12.7 |
| W | 2820 | 10.4 |
|   | 1832 | 11.3 |
|   | 1400 | 12.2 |
|   | 1290 | 13.1 |
|   | 1172 | 13.9 |

As shown in FIG. 2, the plots of log viscosity against water content for Resoles S, T and U do not fall within the area defined by points (i)–(iv). As is evident from the further data of Table XIII, the respective viscosity/water relationships of Resoles V and W also do not fall within the defined area, consistent with the unacceptable foam rating assigned to Foams V and W derived therefrom.

EXAMPLES 14 THROUGH 22

(1) Preparation of Resoles XIV Through XXII

These resoles, which are of the invention, were prepared at an F/P ratio of 1.75 moles of formaldehyde per mole of phenol. Thus, in each preparation, the reactor (10 gallon capacity) was charged with 25 pounds of phenol and 34.9 pounds of a 40 weight percent aqueous solution of formaldehyde. In the preparation of Resoles XIV–XVIII, the condensation was effected in the presence of aqueous sodium hydroxide (70 grams of NaOH in 175 grams of water), the respective reaction mixtures having a pH of 8.3–8.5. The condensation catalyst used in the preparation of Resoles XIX and XX was potassium hydroxide also added as an aqueous solution (113 grams of KOH in 175 grams of water), the pH of the reaction mixtures being 8.4 and 8.3. In the preparation of Resoles XXI and XXII, the condensation was effected in the presence of barium hydroxide monohydrate (160 grams), the reaction mixtures having a pH of 8.4. After heating to 65° C., the respective reaction mixtures were allowed to exotherm to 100° C. at atmospheric pressure. The condensation reactions were then effective at about 100° C. for the respective reaction times given in Tablex XIV and XV hereinbelow. After vacuum cooling to 50°–55° C., the alkaline condensates were treated while stirring with dilute sulfuric acid to bring the final pH of the condensates to a value of 6.2–6.4. The neutralized condensates were then subjected to stripping to remove aqueous distillate. This was accomplished by vacuum stripping at 40.5°–48° C. and a reduced pressure from about 27.5–28 inches of mercury until about 19.3 to about 25 pounds of aqueous distillate had been removed from each condensate. The remaining products, referred to herein as Resoles XIV through XXII, were then cooled to room temperature. Their viscosity and water contents are given in Tables XIV and XV hereinbelow which also set forth the weight percentages of free phenol and formaldehyde contained in the resoles, as well as their weight average molecular weights (GPC, $M_w$).

(2) Foaming of Resoles XIV–XXII

Following the above-described foaming procedure, each of Resoles XIV through XXII was employed as the resole component of Foam Formulation I. Resoles XIV and XXII were also used as the respective resole components of Foam Formulation II in Examples 14-1 and 22-1, respectively. Further, foam was also formed employing Resole XVIII as the resole component of Foam Formulation III in Example 18-1. The results of these various foam preparations are given in Tables XIV and XV which follow.

Table XIV

| Formaldehyde/Phenol Mole Ratio = 1.75 | | | | | | | |
|---|---|---|---|---|---|---|---|
| Example No. | 14 | 14-1 | 15 | 16 | 17 | 18 | 18-1 |
| Resole No. | XIV | XIV | XV | XVI | XVII | XVIII | XVIII |
| Condensation Conditions: | | | | | | | |
| F/P, mole/mole | 1.75 | 1.75 | 1.75 | 1.75 | 1.75 | 1.75 | 1.75 |
| Catalyst | NaOH | NaOH | NaOH | NaOH | NaOH | NaOH | NaOH |
| Temperature, °C. | 100 | 100 | 100 | 100 | 100 | 100 | 100 |
| Time, hours | 0.92 | 0.92 | 1.00 | 1.17 | 1.25 | 1.33 | 1.33 |
| Resole Product: | | | | | | | |
| Phenol, weight % | 6.8 | 6.8 | 4.1 | 6.3 | 3.9 | 5.0 | 5.0 |
| HCHO, weight % | 4.3 | 4.3 | 4.0 | 4.8 | 4.9 | 4.3 | 4.3 |
| GPC, Mw | 509 | 509 | 696 | 795 | 1293 | 1059 | 1059 |
| Viscosity, cps. (25° C.) | 40,800 | 40,800 | 6350 | 66,800 | 32,500 | 264,000 | 264,000 |
| Water content, wt. % | 6.6 | 6.6 | 11.9 | 8.4 | 11.5 | 8.7 | 8.7 |
| Viscosity extrapolated to 12% $H_2O$ | 3900 | 3900 | 5600 | 15,100 | 29,000 | 63,000 | 63,000 |
| Phenolic Foam: Foam No. | 14 | 14-1 | 15 | 16 | 17 | 18 | 18-1 |
| Formulation | I | II | I | I | I | I | III |
| Total water in system, % | 6.6 | 8.5[1] | 11.9 | 8.4 | 11.5 | 8.7 | 8.7 |
| Density, pcf. | 1.66 | 1.91 | 2.28 | 2.53 | 3.21 | 3.27 | 3.27 |
| Compressive strength, parallel, psi. | 20.0 | 23.0 | 27.4 | 31.7 | 52.5 | — | 41.5 |
| Friability, 10 minutes, % wt. loss | 11.0 | 29.0 | 21.6 | 19.4 | 15.6 | — | 16.3 |
| Processability | OK | OK | OK | OK | OK | NG | 2 |
| Punking | Yes | No | No | No | No | — | Yes |
| Overall Foam Rating[2] | UA | 5 | 7 | 7 | 5 | UA | 4 |

[1] Based on actual analysis of Resole XIV after dilution with 2 parts by weight of water phr. in separate determination; resole viscosity at 8.5 weight percent water = 16,320 cps. (25° C.).
[2] UA = unacceptable.

Table XV

| Formaldehyde/Phenol Mole Ratio = 1.75 | | | | | |
|---|---|---|---|---|---|
| Example No. | 19 | 20 | 21 | 22 | 22-1 |
| Resole No. | XIX | XX | XXI | XXII | XXII |
| Condensation Conditions: | | | | | |
| F/P, mole/mole | 1.75 | 1.75 | 1.75 | 1.75 | 1.75 |
| Catalyst | KOH | KOH | Ba(OH)$_2$ | Ba(OH)$_2$ | Ba(OH)$_2$ |
| Temperature,°C. | 100 | 100 | 100 | 100 | 100 |
| Time, hours | 1.00 | 1.25 | 1.00 | 1.25 | 1.25 |
| Resole Product: | | | | | |
| Phenol, weight % | 4.65 | 5.12 | 8.10 | 8.68 | 8.68 |
| HCHO, weight % | 4.32 | 5.22 | 4.31 | 4.51 | 4.51 |
| GPC, Mw | 621 | 919 | 1259 | 1028 | 1028 |
| Viscosity, cps. (25° C.) | 10,800 | 82,800 | 11,920 | 74,700 | 74,700 |
| Water content, wt. % | 10.2 | 10.7 | 8.9 | 9.5 | 9.5 |
| Viscosity extrapolated to 12% $H_2O$ | 6300 | 50,000 | 4700 | 25,300 | 25,300 |
| Phenolic Foam: Foam No. | 19 | 20 | 21 | 22 | 22-1 |
| Formulation | I | I | I | I | II |
| Total water in system, % | 10.2 | 10.7 | 8.9 | 9.5 | 11.3[1] |
| Density, pcf. | 2.17 | 3.22 | — | 2.15 | 2.42 |
| Compressive strength, parallel, psi. | 22.3 | 39.8 | — | — | 33.4 |
| Friability, 10 minutes, % wt. loss | 21.8 | 14.0 | — | — | 22.1 |
| Processability | OK | OK | NG | NG | OK |
| Punking | No | No | — | Yes | Yes |

Table XV-continued

| Formaldehyde/Phenol Mole Ratio = 1.75 | | | | | |
|---|---|---|---|---|---|
| Overall Foam Rating[2] | 5 | 5 | UA | UA | 6 |

[1] Based on actual analysis of Resole XXII after dilution with 2 parts by weight of water phr. in separate determination; resole viscosity at 11.3 weight percent water = 32,000 cps. (25° C.).
[2] UA = unacceptable.

Inspection of the results of Tables XIV and XV shows that each of Resoles XVII, XIX and XX of the invention, when used as the resole component of standard Foam Formulation I, provided foam which qualified for a rating of 5, thereby indicating good processability, a foam density within the target range of 1.90 to 3.70 pcf., a compressive strength of at least 20 psi., a friability of less than 35 weight percent loss and a low punking extent (0–5 percent) in the above-described punking test. Further, Resoles XV and XVI provided foam from Foam Formulation I which qualified for a rating of 7. Thus, Foams 15 and 16 had a density from 2 to 3 pcf. and, within this density range, their compressive strength was at least 25 psi. and their friability was less than 25 percent weight loss, and their punking extents were low enough to qualify for a non-punking or "No" rating in the above-described punking test. The results of Examples 14 and 14-1, 18 and 18-1, 21, and 22 and 22-1, are discussed hereinbelow with reference to Table XVI.

FIG. 2 of the accompanying drawings includes lines labeled XIV, XV, XVI, XVII and XVIII which are respective plots of log viscosity as a function of water content for the correspondingly designated resoles of the invention, these particular resoles having been condensed at an F/P mole ratio of 1.75:1 in the presence of sodium hydroxide catalyst. The viscosity/water measurements on which lines labeled XIV through XVIII of FIG. 2 are based are given in the following Table XVI which also sets forth the results of a similar water dilution study for potassium hydroxide and barium hydroxide catalyzed Resoles XIX, XX, XXI and XXII.

Table XVI

Effect On Viscosity Of Change In Resole Water Content

| Resole | Viscosity (cps. at 25° C.) | Water (weight %) |
|---|---|---|
| XIV | 40,800 | 6.6 |
| | 24,640 | 7.6 |
| | 16,320 | 8.5 |
| | 10,840 | 9.4 |
| | 8200 | 10.3 |
| XV | 6350[1] | 11.9[1] |
| | 31,750 | 7.7 |
| | 19,100 | 8.6 |
| | 12,000 | 9.5 |
| | 9300 | 10.4 |
| | 7340 | 11.3 |
| XVI | 66,800 | 8.4 |
| | 41,500 | 9.3 |
| | 29,150 | 10.3 |
| | 20,750 | 11.2 |
| | 15,000 | 12.1 |
| XVII | 32,500 | 11.5 |
| | 25,500 | 12.4 |
| | 19,080 | 13.3 |
| | 15,700 | 14.1 |
| | 14,200 | 15.0 |
| XVIII | 264,000 | 8.7 |
| | 154,000 | 9.6 |
| | 111,400 | 10.5 |
| | 80,000 | 11.4 |
| | 56,900 | 12.3 |
| XIX | 10,800 | 10.2 |
| | 8660 | 11.1 |
| | 6450 | 12.0 |
| | 4800 | 12.9 |
| | 3750 | 13.8 |
| XX | 82,800 | 10.7 |
| | 60,800 | 11.6 |
| | 42,250 | 12.5 |
| | 39,500 | 13.4 |
| | 17,580 | 14.3 |
| XXI | 11,920 | 8.9 |
| | 9700 | 9.8 |
| | 7350 | 10.6 |
| | 5700 | 11.4 |
| | 4400 | 12.3 |
| XXII | 74,700 | 9.5 |
| | 45,000 | 10.4 |
| | 32,000 | 11.3 |
| | 24,700 | 12.2 |
| | 18,140 | 13.1 |

[1] Resole XV as prepared and foamed had a viscosity of 6350 centipoise (25.0° C.) at a water content of 11.9 weight percent. In this study of change in viscosity with variation in water content, Resole XV was stripped of water to a level of 7.7 weight percent (viscosity at 25.0° C. = 31,750 centipoise) and was then diluted with water; the results are as given. The final viscosity of 7340 centipoise at 11.3 weight percent water, is in substantial agreement with the initial value of 6350 centipoise at 11.9 weight percent water, thereby indicating that the stripping operation did not substantially alter the average molecular weight of Resole XV.

As substantiated by the data of Table XVI, either the values for the initial viscosity and water content of Resoles XIV–XXII fall within the area defined by straight line interconnection in series of points (i)–(iv) of FIG. 2 or respective plots of their viscosity on a logarithmic scale as a function of water content falls or, upon straight line extrapolation thereof (such as the plot of Resole XVIII), extends into the defined area. It is thereby indicated that the average molecular weight of Resoles XIV–XXII, as reflected by their viscosity/water relationship, is such to allow for the formation of foam having good processability as well as a combination of density, friability resistance and compressive strength within the above-defined foam property criteria. This is consistent, for example, with the above-discussed foam performance of Resoles XV, XVI, XVII, XIX and XX. It is also consistent with the results obtained with Resoles XIV, XVIII and XXII, as detailed below.

With reference to Table XIV, Foam 14 produced with Resole XIV in Foam Formulation I was assigned an unacceptable overall foam rating because its density was 1.66 pcf. (and thus less than the target minimum of 1.90 pcf.), although processability was acceptable, compressive strength was 20.0 psi. and friability was only 11.0 percent weight loss. However, in Example 14-1 in which Resole XIV was used as the resole component of Foam Formulation II, the foam product qualified for a rating of 5. The higher density of 1.91 pcf. achieved in Example 14-1, is attributable to the presence in Foam Formulation II of additional water the function of which is to decrease the overall reactivity (or exotherm) of the system and thereby provide higher density foam. Thus, Foam Formulation II is effective for recovery of foam having the desired combination of mechanical properties in those instances where resoles of the invention have a water/viscosity relationship towards the "hot side" (or within the lower range of average molecular weight) of the area bounded by points (i)-(iv) of the graphs of the accompanying Figures, as illustrated by the position of line labeled XIV of FIG. 2 which is the viscosity/water relationship of Resole XIV. Foam Formulation II was also effective in providing an acceptable foam from Resole XXII. Thus, whereas the processability of foam derived from Resole XXII using standard Foam Formulation I was unacceptable (Example 22 of Table XV), the foam product produced using Resole XXII as the resole component of Foam Formulation II qualified for an excellent rating of 6 (Example 22-1 of Table XV). On the other hand, when the average molecular weight of a given resole was, in the first instance, outside of the viscosity/water relationships defined herein, Foam Formulation II was not effective in recovering a satisfactory foam product from the standpoint of the mechanical foam property criteria hereindefined. For example, Resole P which is not within the scope of the present invention, provided foam in Run P (Table V) to which an unacceptable rating was assigned. In Run P-1 in which Resole P was used as the resole component of Foam Formulation II, the foam product still did not qualify for an acceptable rating of at least 4. In fact, processability was adversely affected (foam processability having been "OK" in Run P), density was still low (1.71 pcf.), compressive strength was only 10.7 psi. and friability was high (82 percent weight loss). Similarly, Foam Formulation II was also ineffective in providing acceptable foam from Resole R which is also not a resole of the invention (Run R-1 of Table V).

As further shown by FIG. 2, the water/viscosity relationship for Resole XVIII (line labeled XVIII) extends within the area defined for resoles of the invention which have been condensed at an F/P ratio of 1.75:1. Although when employed as the resole component of standard Foam Formulation I in Example 18, Resole XVIII provided foam having unacceptable processability, when used as the resole component of Foam Formulation III, Resole XVIII provided a foam in Example 18-1 which qualified for a rating of 4. The unacceptable processability of Foam 18 of Example 18 is explainable by the high initial viscosity (264,000 centipoise at 25° C.) of Resole XVIII. It is believed, therefore, that because of the presence of additional blowing agent in Foam Formulation III, the viscosity of Resole XVIII was lowered sufficiently in Example 18-1 to avoid processing defects. On the other hand, when the viscosity/water relationship of a given resole was not, in the first instance, within the respective areas defined herein, Foam Formulation III was ineffective in recovering a satisfactory foam product from the standpoint of the criteria defined herein. For example, Resole K which is not within the scope of the present invention, provided foam in Run K (Table IV) to which an unacceptable rating was assigned. In Run K-1 in which Resole K was used as the resole component of Foam Formulation III, the foam product still did not qualify for an acceptable overall foam rating.

With further reference to the data of Table XV, it is noted that anomalous results were obtained in Example 21 in which barium hydroxide-catalyzed Resole XXI was used. As shown by the water dilution data of Table XVI, the viscosity/water relationship of Resole XXI falls within the area defined by straight line interconnection in series of points (i)–(iv) of FIG. 2. However, void formation of the foam product of Example 21 was excessive and thus the foam was assigned an unacceptable rating. The deleterious void formation indicates that Resole XXI may not have been advanced sufficiently to realize good processability. Thus, for the reasons advanced hereinabove with respect to the foam performance of Resole VII which was also condensed in the presence of barium hydroxide, a more severe reaction condition (for example, a reaction time longer than the one hour applied in forming Resole XXI such as 1.25-1.5 hours) appears necessary when condensing phenol and formaldehyde in the presence of barium hydroxide at an F/P ratio of 1.75:1.

With further reference to FIG. 2, it is noted that the log viscosity/water relationship of Resoles XV and XVI also falls within the area contained by interconnection in series of points (a)-(e). This area defines the preferred viscosity/water relationship for resoles condensed at an initial F/P mole ratio of 1.75:1 in that overall, resoles which do exhibit this relationship, provide foams having a density within the preferred range of 2.0–3.0 pcf., a friability of less than 25 percent weight loss and a compressive strength of at least 25 psi., and additionally, are of low punking extent as determined by the above-described punking test.

RUNS Z THROUGH FF

(1) Preparation of Resoles Z Through FF

These resoles, which are not of the invention, were prepared at an F/P ratio of 1.60 moles of formaldehyde per mole of phenol. Thus, in each preparation, the reactor (10 gallon capacity) was charged with 25 pounds of phenol and 31.9 pounds of a 40 weight percent aqueous solution of formaldehyde. In the preparation of Resoles Z, AA and BB, the condensation was effected in the presence of sodium hydroxide (70 grams of NaOH in 175 grams of water), the respective reaction mixtures having a pH of 8.55, 8.45 and 8.5. The condensation catalyst employed in the preparation of Resoles CC, DD and EE was potassium hydroxide also added as an aqueous solution (113 grams of KOH in 175 grams of water), the pH of the reaction mixtures being 8.25. In the preparation of Resole FF, the condensation was effected in the presence of barium hydroxide monohydrate (160 grams), the reaction mixture having a pH of 8.5. After heating to 65° C., the respective reaction mixtures were allowed to exotherm to 100° C. and were then refluxed at about 100° C. and atmospheric pressure for the reaction times given in Tables XVII and XVII. At the end of the indicated reaction times, the alkaline condensates were vacuum cooled to 50°-55° C. and were then treated with dilute sulfuric acid (adding back potassium hydroxide in the neutralization step of Resole EE) to bring the pH of the respective condensates to 6.1-6.45. The neutralized condensates were then subjected to stripping to remove aqueous distillate. This was accomplished by vacuum stripping at 40°-56° C./27.5-28 inches of mercury or until about 17.8-19.8 pounds of aqueous distillate had been removed in each distillation. The remaining products, designated herein as Resoles Z and AA through FF, respectively, were then cooled to room temperature. Their viscosity and water contents are given in Tables XVII and XVIII which also set-forth the weight percentages of free phenol and formaldehyde, as well as the weight average molecular weights (GPC, $M_w$) for each resole.

(2) Foaming of Resoles Z Through FF

Following the above-described general foaming procedure, each of these resoles was used as the resole component of Foam Formulation I. In addition, Resoles Z and AA were also tested as the resole component of Foam Formulation II (Runs Z-1 and AA-1) and Resole EE was tested in Foam Formulation III (Run EE-1). The results are given in Tables XVII and XVIII which follow.

provided foam to which an unacceptable rating was assigned because of poor processability and a foam density outside of the target range of 1.90 to 3.70 pcf. Variation in the foam formulation as in the formation of Foams Z-1, AA-1 and EE-1 using Foam Formulations II and III, did not alter the initial rating of unacceptable foam derived from Resoles Z, AA and EE.

Figure 3:
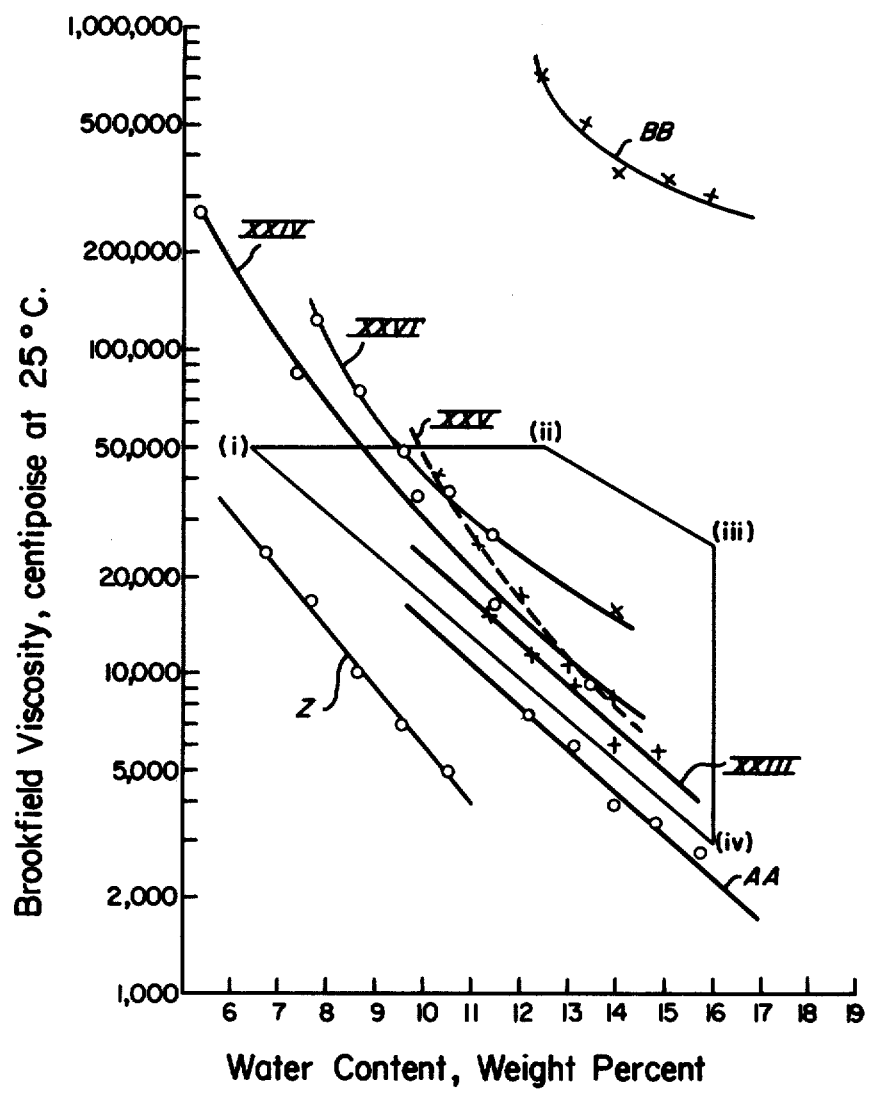
FIG. 3 is also a graph on a logarithmic scale, of resole viscosity plotted against water content of the resole where the particular resoles had been produced at a formaldehyde-to-phenol mole ratio of about 1.6 using sodium hydroxide as the condensation catalyst.

FIG. 3 of the accompanying drawings includes a plot of log viscosity as a function of water content for Resoles Z, AA and BB. These particular plots are labeled

Table XVII

| Formaldehyde/Phenol Mole Ratio = 1.60 | | | | | |
|---|---|---|---|---|---|
| Resole No. | Z | Z | AA | AA | BB |
| Run No. | Z | Z-1 | AA | AA-1 | BB |
| Condensation Conditions: | | | | | |
| F/P mole/mole | 1.60 | 1.60 | 1.60 | 1.60 | 1.60 |
| Catalyst | NaOH | NaOH | NaOH | NaOH | NaOH |
| Temperature, °C. | 100 | 100 | 100 | 100 | 100 |
| Time, hours | 1.00 | 1.00 | 1.12 | 1.12 | 1.58 |
| Resole Product: | | | | | |
| Phenol, weight % | 5.60 | 5.60 | 6.09 | 6.09 | 4.96 |
| HCHO, weight % | 3.55 | 3.55 | 4.97 | 4.97 | 4.41 |
| GPC, Mw | 1301 | 1301 | 678 | 678 | 2155 |
| Viscosity, cps. (25° C.) | 23,500 | 23,500 | 7500 | 7500 | 700,000 |
| Water content, wt. % | 6.8 | 6.8 | 12.2 | 12.2 | 12.5 |
| Viscosity extrapolated to 12% $H_2O$ | 2600 | 2600 | 8000 | 8000 | >700,000 |
| Phenolic Foam: Foam No. | Z | Z-1 | AA | AA-1 | BB |
| Formulation | I | II | I | II | I |
| Total water in system, % | 6.8 | 8.7[1] | 12.2 | 14[2] | 12.5 |
| Density, pcf. | 1.39 | 1.53 | 1.79 | 1.84 | TOO |
| Compressive strength, parallel, psi. | 13.6 | 15.9 | 20.6 | 19.3 | VISCOUS |
| Friability, 10 Minutes, % wt. loss | 15.2 | 19.4 | 29.0 | 27.5 | TO FOAM |
| Processability | OK | NG | NG | NG | NG |
| Punking | Yes | Yes | — | Yes | — |
| Overall Foam Rating[3] | UA | UA | UA | UA | (UA) |

[1] Based on actual analysis of Resole Z after dilution with 2 parts by weight of water phr. in separate determination; resole viscosity at 8.7 weight percent water = 10,000 cps. (25° C.).
[2] Based on actual analysis of Resole AA after dilution with 2 parts by weight of water phr. in separate determination; resole viscosity at 14 weight percent water = 3950 cps. (25° C.).
[3] UA = unacceptable.

Table XVIII

| Formaldehyde/Phenol Mole Ratio = 1.60 | | | | | |
|---|---|---|---|---|---|
| Resole No. | CC | DD | EE | EE | FF |
| Run No. | CC | DD | EE | EE-1 | FF |
| Condensation Conditions: | | | | | |
| F/P, mole/mole | 1.60 | 1.60 | 1.60 | 1.60 | 1.60 |
| Catalyst | KOH | KOH | KOH | KOH | Ba(OH)$_2$ |
| Temperature, °C. | 100 | 100 | 100 | 100 | 100 |
| Time, hours | 0.5 | 1.00 | 1.50 | 1.50 | 1.00 |
| Resole Product: | | | | | |
| Phenol, weight % | 9.49 | 6.74 | 4.63 | 4.63 | 11.84 |
| HCHO, weight % | 4.76 | 3.16 | 3.07 | 3.07 | 3.31 |
| GPC, Mw | 421 | 550 | 1640 | 1640 | 775 |
| Viscosity, cps. (25° C.) | 706 | 3680 | 109,000 | 109,000 | 32,250 |
| Water content, wt. % | 10.2 | 11.4 | 13.9 | 13.9 | 6.5 |
| Viscosity extrapolated to 12% $H_2O$ | 470 | 3200 | >109,000 | >109,000 | 4650 |
| Phenolic Foam: Foam No. | CC | DD | EE | EE-1 | FF |
| Formulation | I | I | I | III | I |
| Total water in system, % | 10.2 | 11.4 | 13.9 | 13.9 | 6.5 |
| Density, pcf. | 0.96 | 1.62 | 4.47 | 3.90 | 1.31 |
| Compressive strength, parallel, psi. | 2.9 | 13.0 | — | 40.8 | 14.1 |
| Friability, 10 minutes, % wt. loss | 43.2 | 31.4 | — | — | — |
| Processability | NG | OK | NG | NG | NG |
| Punking | — | Yes | — | Yes[2] | Yes |
| Overall Foam Rating[2] | UA | UA | UA | UA | UA |

[1] UA = unacceptable.
[2] Modified test, as previously described herein.

Inspection of the results of Tables XVII and XVIII shows that in each instance, Resoles Z and AA to FF correspondingly and are based on the measurements of viscosity at the indicated water contents given in Table XIX which also includes the results of a similar water dilution study for Resoles CC through FF. Table XIX follows.

Table XIX

| Resole | Viscosity (cps. at 25° C.) | Water (weight %) |
|---|---|---|
| Z | 23,000 | 6.8 |
|  | 16,800 | 7.7 |
|  | 10,000 | 8.7 |
|  | 6950 | 9.6 |
|  | 4950 | 10.5 |
| AA | 7500 | 12.2 |
|  | 5420 | 13.1 |
|  | 3950 | 14.0 |
|  | 3425 | 14.8 |
|  | 2750 | 15.7 |
| BB | 700,000 | 12.5 |
|  | 504,000 | 13.4 |
|  | 356,000 | 14.2 |
|  | 336,000 | 15.1 |
|  | 300,000 | 16.0 |
| CC | 706 | 10.2 |
|  | 550 | 11.1 |
|  | 474 | 12.0 |
|  | 360 | 12.9 |
|  | 312 | 13.7 |
| DD | 3680 | 11.4 |
|  | 3050 | 12.3 |
|  | 2450 | 13.2 |
|  | 2060 | 14.1 |
|  | 1650 | 14.9 |
| EE | 109,000 | 13.9 |
|  | 96,000 | 14.8 |
|  | 93,000 | 15.6 |
|  | 91,400 | 16.5 |
|  | 93,500 | 17.4 |
| FF | 32,250 | 6.5 |
|  | 25,750 | 7.4 |
|  | 16,800 | 8.4 |
|  | 11,440 | 9.3 |
|  | 9200 | 10.2 |

As shown in FIG. 3, the plots of log viscosity against water content for Resoles Z, AA and BB do not fall within the area defined by straight line interconnection in series of points (i)–(iv). As is evident from the further data of Table XIX, the respective viscosity/water relationships of Resoles CC–FF also do not fall within the defined area, consistent with the unacceptable foam performance for these particular resoles from the standpoint of the above-outlined criteria for foam processability, foam density, friability resistance and compressive strength.

EXAMPLES 23 THROUGH 27

(1) Preparation of Resoles XXIII Through XXVII

These resoles, which are of the invention, were prepared at an F/P ratio of 1.60 moles of formaldehyde per mole of phenol. Thus, in each preparation, the reactor (10 gallon capacity) was charged with 25 pounds of phenol and 31.9 pounds of a 40 weight percent aqueous solution of formaldehyde. In the preparation of Resoles XXIII–XXVI, the condensation was effected in the presence of sodium hydroxide (70 grams of NaOH in 175 grams of water), the respective reaction mixtures having a pH of 8.3–8.45. In the preparation of Resole XXVII, the condensation was effected in the presence of barium hydroxide monohydrate (160 grams), the reaction mixture having a pH of 8.45. After heating to 65° C., the respective reaction mixtures were allowed to exotherm to 100° C. and were then refluxed at about 100° C. and atmospheric pressure for the reaction times given in Table XX. At the end of the indicated reaction times, the alkaline condensates were vacuum cooled to 50°–55° C. and were then treated with dilute sulfuric acid (adding back sodium hydroxide in the neutralization step of Resoles XXIII and XXVI) to bring the pH of the respective condensate to 6.25–6.4. The neutralized condensates were then subjected to stripping to remove aqueous distillate. This was accomplished by vacuum stripping at 45°–50° C./27.5–27.8 inches of mercury or until about 18.3–20 pounds of aqueous distillate has been removed in each distillation. The remaining products, designated herein as Resoles XXIII through XXVII, respectively, were then cooled to room temperature. Their viscosity and water contents are given in Table XX hereinbelow which also sets forth, where determined, their weight percentages of free phenol and formaldehyde, as well as weight average molecular weights (GPC, $M_w$).

(2) Foaming of Resoles XXIII–XXVII

Following the above-described general foam procedure, each of Resoles XXIII–XXVII was used as the resole component of Foam Formulation I. Resoles XXIII and XXVII were also evaluated as the resole component of Foam Formulation II (Examples 23-1 and 27-1). The foam test data are given in Table XX which follows.

Table XX

| | Formaldehyde/Phenol Mole Ratio = 1.60 | | | | | | |
|---|---|---|---|---|---|---|---|
| Example No. | 23 | 23-1 | 24 | 25 | 26 | 27 | 27-1 |
| Resole No. | XXIII | XXIII | XXIV | XXV | XXVI | XXVII | XXVII |
| Condensation Conditions: | | | | | | | |
| F/P, mole/mole | 1.60 | 1.60 | 1.60 | 1.60 | 1.60 | 1.60 | 1.60 |
| Catalyst | NaOH | NaOH | NaOH | NaOH | NaOH | Ba(OH)$_2$ | Ba(OH)$_2$ |
| Temperature, °C. | 100 | 100 | 100 | 100 | 100 | 100 | 100 |
| Time, hours | 1.50 | 1.50 | 1.25 | 1.17 | 1.75 | 1.25 | 1.25 |
| Resole Product: | | | | | | | |
| Phenol, weight % | — | — | 3.16 | 6.34 | 4.65 | 10.95 | 2.95 |
| HCHO, weight % | — | — | 2.71 | 9.63 | 4.61 | 2.89 | 2.89 |
| GPC, Mw | 906 | 906 | 1261 | 836 | 1206 | — | — |
| Viscosity, cps. (25° C.) | 15,080 | 15,080 | 21,750[1] | 41,200 | 35,000[2] | 138,000 | 138,000 |
| Water content, wt. % | 11.4 | 11.4 | 10.7 | 10.3 | 10.5 | 8.4 | 8.4 |
| Viscosity extrapolated to 12% H$_2$O | 12,600 | 12,600 | 15,000 | 16,800 | 26,500 | 36,500 | 36,500 |
| Phenolic Foam: Foam No. | 23 | 23-1 | 24 | 25 | 26 | 27 | 27-1 |
| Formulation | I | II | I | I | I | I | II |
| Total water in system, % | 11.4 | 13.2[3] | 10.7 | 10.3 | 10.5 | 8.4 | 10.2[4] |
| Density, pcf. | 2.00 | 1.99 | 2.20 | 2.18 | 2.24 | 2.06 | 2.42 |
| Compressive strength, | | | | | | | |

Table XX-continued

| Formaldehyde/Phenol Mole Ratio = 1.60 | | | | | | | |
|---|---|---|---|---|---|---|---|
| parallel, psi. | 20.1 | 22.0 | 27.1 | 26.5 | 21.9 | — | 33.0 |
| Friability, 10 minutes, % wt. loss | 19.9 | 25.5 | 18.5 | 17.2 | 18.8 | — | 25.5 |
| Processability | OK | OK | OK | OK | OK | NG | OK |
| Punking | Yes | Yes | Yes | — | No | — | Yes |
| Overall Foam Rating[5] | 4 | 4 | 6 | at least 6 | 5 | UA | 4 |

[1]Inasmuch as the initial viscosity was high (266,000 cps. at 25° C.), for foaming added 5.4 parts of water to bring resole to a viscosity of 21,750 cps. and a water content, as analyzed, of 10.7 weight percent.

[2]In view of the initial viscosity of 122,800 cps. at 25° C., 3.0 parts of water were added to bring resole viscosity to 35,000 cps. at a water content, as analyzed, of 10.5 weight percent.

[3]Based on actual analysis of Resole XXIII after dilution with 2 parts by weight of water phr. in separate determination; resole viscosity at 13.2 weight percent water = 9100 cps. (25° C.).

[4]Based on actual analysis of Resole XXVII after dilution with 2 parts by weight of water phr. in separate determination; resole viscosity at 10.2 weight percent water = 68,000 cps (25° C.).

[5]As previously defined herein.

The results of Table XX show that each of sodium hydroxide-catalyzed Resoles XXIII to XXVI, when used as the resole component of Foam Formulation I, provided foam which qualified for a rating of 4, 5 or 6. Although barium hydroxide-catalyzed Resole XXVII did not provide foam of acceptable processability when tested in Foam Formulation I, foam produced therewith using Foam Formulation II did have acceptable processability as well as a density within the preferred 2 to 3 pcf. range, and a good combination of friability resistance and compressive strength.

FIG. 3 of the accompanying drawings includes lines labeled XXIII, XXIV, XXV and XXVI which are respective plots of log viscosity as a function of water content for the correspondingly designated resoles of the invention which had been prepared at an F/P mole ratio of 1.60:1 in the presence of sodium hydroxide catalyst. As shown in FIG. 3, each of these lines falls within the area defined by straight line interconnection in series of points (i)–(iv). It is thereby indicated that these resoles of the invention have an average molecular weight, as reflected by their viscosity/water relationship, necessary to provide phenolic foam having a density of 1.90–3.70 pcf. and, within this density range, a compressive strength of at least 20 psi, and a friability of less than 35 percent weight loss. The measurements on which lines labeled XXIII–XXVI of FIG. 3 are based are given in the following Table XXI which also set forths corresponding data for Resole XXVII.

Table XXI

| Resole | Viscosity (cps. at 25° C.) | Water (weight %) |
|---|---|---|
| XXIII | 15,080 | 11.4 |
| | 11,300 | 12.3 |
| | 9100 | 13.2 |
| | 6000 | 14.0 |
| | 5650 | 14.9 |
| XXIV | 266,000 | 5.4 |
| | 86,500 | 7.3 |
| | 35,000 | 9.1 |
| | 16,400 | 10.9 |
| | 9400 | 12.7 |
| XXV | 41,200 | 10.3 |
| | 25,200 | 11.2 |
| | 17,700 | 12.1 |
| | 10,700 | 13.0 |
| | 8500 | 13.9 |
| XXVI | 122,800 | 7.8 |
| | 77,000 | 8.7 |
| | 48,800 | 9.6 |
| | 36,900 | 10.4 |
| | 27,250 | 11.5 |
| XXVII | 138,000 | 8.4 |
| | 97,000 | 9.3 |

Table XXI-continued

| Resole | Viscosity (cps. at 25° C.) | Water (weight %) |
|---|---|---|
| | 68,000 | 10.2 |
| | 49,000 | 11.2 |
| | 36,750 | 12.1 |

A plot of log viscosity against the water contents given in Table XXI for Resole XXVII, also falls within the area bound by points (i)–(iv) of FIG. 3.

As previously noted herein, an effort was made to characterize the polymers of the invention by their weight average molecular weight as determined by gel permeation chromatography (GPC, $M_w$). Ranges based on the values given herein for the resoles of the invention as well as for resoles not of the invention, are set forth in the following Table XXII.

Table XXII

| F/P Ratio | Resoles Encompassed By Range | GPC, $M_w$ range[1] |
|---|---|---|
| 2.1 | O, P | 365–1054 |
| 2.1 | K, Q | 1618–2004 |
| 2.1 | I–XIII | 529–913 |
| 1.75 | S, T, W | 500–546 |
| 1.75 | V, U | 1575–1706 |
| 1.75 | XIV–XXII | 509–1293 |
| 1.60 | CC, DD, AA, FF, Z | 421–1301 |
| 1.60 | EE, BB | 1640–2155 |
| 1.60 | XXIII–XXVII | 836–1261 |

[1]The underscored values appear anomalous.

As shown by the above ranges, the GPC, $M_w$ values do indicate certain trends consistent with the performance of the resoles as foamable resins, although for the reasons previously discussed herein, such values are not precise. Thus, Resoles O, P, S, T, W, Z, AA, CC, DD and FF (which are not of the invention) had relatively low GPC, $M_w$ values and provided unacceptable foam from the standpoint of the foam property criteria set forth herein, thereby indicating that these resoles were too reactive. Resoles K, Q, V, U, EE and BB (also not of the invention) had relatively high GPC, $M_w$ values and, because they provided unsatisfactory foam or were of very high viscosity, they appeared "too dead" or of insufficient reactivity as foamable resins. Generally, the resoles of the invention (I–XXVII) had intermediate GPC, $M_w$ values, thereby indicating that their extent of advancement was approprirate from the standpoint of providing foams having the properties described herein. Although the GPC, $M_w$ values do indicate the above trends, they are nevertheless a far less satisfactory and reliable means of characterizing the resoles of the invention than the viscosity/water relationship described herein, as is also evident from the overlap in ranges, as underscored in Table XXII.

It is evident that the present invention provides a particular class of phenol/formaldehyde polymers which are foamable to cellular phenolic products of good quality from the standpoint of being free of excessive voids and other physical defects (e.g., severe stress cracks and shrinkage) and which also have an especially good combination of mechanical properties including an economic foam density, good friability resistance and high compressive strength. These unique characteristics in turn make the phenolic foam of the invention especially useful as construction foam. It is also evident that resoles of the invention such as, for example, those designated herein as Resoles VIII–XIII, XV and XVI, respectively, are capable of providing good quality foam having a density from about 2 to 3 pcf. and, within this foam density range, a compressive strength of at least 25 psi, and a friability of less than 25 percent weight loss (10 minute test) and which, in addition, exhibit improved resistance to punking.

A further advantage realized by the teachings of the present invention is that the foamable resoles are derived from phenol and formaldehyde as the sole organic reactants fed to the reaction zone. This is, as previously noted, in contrast to other approaches involving the use of additional reactants in the formation of the polymer. It was of interest to study the properties of foam derived from phenolic polymers produced by the particular two-stage process involving the use of the difunctional reactant, ortho-cresol, described in previously mentioned U.S. Pat. Nos. 3,876,620 and 3,968,300. To this end, a phenolic polymer was prepared substantially following the procedure of Example 1 of U.S. Pat. No. 3,968,300 which method is also as described in U.S. Pat. No. 3,876,620. This particular preparation is referred to herein as Run GG.

RUN GG (1) Preparation of Phenolic Polymer GG

To a 10 gallon reactor there was charged 20 pounds of ortho-cresol (0.19 pound-mole), 9 pounds of paraformaldehyde (91 weight percent; 0.273 pound-mole of HCHO), and a 50 weight percent aqueous solution of sodium hydroxide (84.5 grams of sodium hydroxide dissolved in 84.5 grams of water). The reaction mixture was allowed to exotherm, controlling the reaction temperature at 125°–126° C. with cooling. Thereafter, the reaction temperature was maintained at 100° C. for about 1.0 hour. After vacuum cooling to 75°–55° C., there was added 17.4 pounds of phenol (0.19 pound-mole), and 4.8 pounds of paraformaldehyde (91 weight percent; 0.146 pound-mole of HCHO). The resulting mixture was allowed to exotherm to 80° C. and was thereafter maintained at 80° C. for 3.5 hours. After this period, the cooled reaction mixture had a pH of 9.3. It was then neutralized by the addition of acetic acid until the pH was lowered to 6.7. The reaction product (47 pounds) had a viscosity of 41,875 centipoise (25° C.), a water content of 7.4 weight percent, a phenol content of 10.4 weight percent, and a formaldehyde content of 0.56 weight percent. This product is referred to herein as Phenolic Polymer GG.

(2) Foam Produced With Phenolic Polymer GG

Following the above-described general foaming procedure, Phenolic Polymer GG was used as the "resole component" of Foam Formulation I (Run GG-1). The results are given in Table XXIII hereinbelow which also repeats, for convenience, the foaming results obtained with Resole XI of the present invention (Examples 11 and 11-1), as well as the k factor or thermal conductivity of Resole XI. Table XXIII also includes the results obtained by the use of Phenolic Polymer GG in other formulations (Runs GG-2 to -6 ) in which the concentration and nature of the foaming catalyst was varied as well as the blowing agent and surfactant. In Runs GG-2 to -6, the above described general foaming procedure was also used except that in forming the foams of Runs GG-2, -4, -5 and -6, the foam box was not preheated at 125° C. but was instead at ambient temperature. Table XXIII follows.

Table XXIII

| Example No. | 11 | 11-1 | — | — | — | — | — | — |
|---|---|---|---|---|---|---|---|---|
| Run No. GG- | — | — | −1 | −2 | −3 | −4 | −5 | −6 |
| Foam Formulation | | | | | | | | |
| Polymer: | | | | | | | | |
| Resole XI[1] | 100 | 100 | — | — | — | — | — | — |
| Phenolic Polymer GG[2] | — | — | 100 | 100 | 100 | 100 | 100 | 100[3] |
| Catalyst: | | | | | | | | |
| 65% aqueous phenol sulfonic acid | 8 | 8 | 8 | 13 | — | — | — | — |
| 67% aqueous ULTRA TX Acid[4] | — | — | — | — | 13 | 13 | 13 | 13 |
| Surfactant[5]: | | | | | | | | |
| L-5420[6] | 2 | 2 | 2 | 2 | — | — | — | — |
| L-5340[6] | — | — | — | — | 2 | 2 | 2 | 2 |
| Blowing Agent: | | | | | | | | |
| CCl$_2$F—CClF$_2$ | 9 | 12 | 9 | 9 | — | 10 | 6.4 | 6.4 |
| CCl$_3$F | — | — | — | — | 10 | — | 3.6 | 3.6 |
| Preheat Foam Box[7] | Yes | Yes | Yes | No | Yes | No | No | No |
| Cream time, seconds | 105 | 100 | 65 | 80 | 105 | 95 | 60 | 90 |
| Rise time, seconds | 298 | 370 | 227 | 200 | 228 | 187 | 193 | 270 |
| Foam Quality and Properties: | | | | | | | | |
| Voids | OK | OK | OK | OK | OK | OK | OK | OK |
| Shrinkage | None | None | Severe | None | V.S.[8] | None | None | None |
| Density, pcf. | 2.51 | 2.04 | 1.20 | 1.75 | — | 1.91 | 1.81 | 1.68 |
| Friability, 10 minutes, % wt. loss | 17.7 | 21.6 | 19.5 | 12.0 | — | 6.5 | 4.8 | 13.6 |
| Compressive strength, psi. | | | | | | | | |

Table XXIII-continued

| | | | | | | | | |
|---|---|---|---|---|---|---|---|---|
| parallel | 33.8 | 25.5 | 8.8 | 15.0 | — | 19.1 | 21.4 | 17.8 |
| perpendicular | 15.1 | 11.4 | — | 10.0 | — | 9.5 | 10.6 | 8.5 |
| Punking rating[9] | — | No | — | Yes | — | Yes | Yes | Yes |
| k factor, BTU in./°F. hr. ft[2] | — | 0.228 | — | 0.225 | — | 0.229 | 0.225 | 0.230 |
| Overall Foam Rating[9] | at least 6[10] | 7 | UA | UA | UA | UA | UA | UA |

[1] A phenol/formaldehyde resole of the present invention as described hereinabove under Example 11.
[2] Not a polymer of the invention; produced with ortho-cresol by the two-stage method described in U.S. Pat. Nos. 3,876,620 and 3,968,300.
[3] 2.0 parts by weight of distilled water per 100 parts of polymer (phr.) was added to prevent void formation.
[4] Available from Witco Chemical Company.
[5] Surfactant 74LK6 employed in foam examples of U.S. Pat. No. 3,968,300 was not available.
[6] Silicone Surfactants available from Union Carbide Corporation.
[7] To 125° C. for 7 minutes as described under the general foaming procedure.
[8] Very severe.
[9] As previously defined herein.
[10] See footnote [3] of Table X herein.

It is evident from the results of Table XXIII that, although foams derived from Phenolic Polymer GG (phenol/ortho-cresol/formaldehyde) prepared by the two-stage method described in U.S. Pat. Nos. 3,876,620 and 3,968,300, do provide phenolic foam having low friability, the foam products were deficient from the standpoint of the criteria against which the phenolic foam of the present invention was rated. Thus, although Resole XI of the invention provided foam from Foam Formulation I (Example 11) having a density within the range of 2 to 3 pcf., a friability of less than 25 percent weight loss and a compressive strength of at least 25 psi., Phenolic Polymer GG when foamed with Foam Formulation I (Run GG-1) provided a low density foam (1.20 pcf.) and was thus rated unacceptable within the context of the present invention. The foam product of Run GG-1 was also unsatisfactory in view of severe shrinkage. In addition, Phenolic Polymer GG provided foam of low compressive strength (i.e., less than 20 psi. in the parallel measurement) in all runs except Run GG-5 but the density of the foam of the latter run was less than the target range of 1.90-3.70 pcf.

What is claimed is:

1. A phenolic resole capable of being foamed to a phenolic foam having a density from 1.90 to 3.70 pounds per cubic foot and, within said density range, a friability of less than 35 percent weight loss (after 10 minutes) and a compressive strength (parallel of at least 20 pounds per square inch which resole has been produced by the base-catalyzed condensation of formaldehyde and phenol at a formaldehyde-to-phenol mole ratio from about 1.6:1 to about 2.2:1, the aqueous alkaline condensate having been brought to a pH from about 5.0 to about 7.0 by the addition thereto of a salt-forming acidic compound, said resole being characterized by an average molecular weight such that a plot of log viscosity as a function of water content of the resole falls within the area defined by straight line interconnection in series of points (i)–(iv) where points (i)–(iv) are as follows for the indicated formaldehyde-to-phenol mole ratios:

(a) at a formaldehyde-to-phenol mole ratio of at least 1.9:1 and no more than about 2.2:1, points (i)–(iv) are:
  (i) a viscosity of about 50,000 centipoise at a water content of about 1.7 weight percent;
  (ii) a viscosity of about 50,000 centipoise at a water content of about 9.5 weight percent;
  (iii) a viscosity of about 12,000 centipoise at a water content of about 15.0 weight percent; and
  (iv) a viscosity of about 1,000 centipoise at a water content of about 15.0 weight percent;

(b) at a formaldehyde-to-phenol mole ratio of at least 1.7:1 and less than 1.9:1, points (i)–(iv) are:
  (i) a viscosity of about 50,000 centipoise at a water content of about 3.0 weight percent;
  (ii) a viscosity of about 50,000 centipoise at a water content of about 14.0 weight percent;
  (iii) a viscosity of about 25,000 centipoise at a water content of about 16.0 weight percent; and
  (iv) a viscosity of about 1,000 centipoise at a water content of about 16.0 weight percent;

(c) at a formaldehyde-to-phenol mole ratio of at least about 1.6:1 and less than 1.7:1, points (i)–(iv) are:
  (i) a viscosity of about 50,000 centipoise at a water content of about 6.5 weight percent;
  (ii) a viscosity of about 50,000 centipoise at a water content of about 12.5 weight percent;
  (iii) a viscosity of about 25,000 centipoise at a water content of about 16.0 weight percent; and
  (iv) a viscosity of about 3,000 centipoise at a water content of about 16.0 weight percent;

wherein the said viscosity values are Brookfield at 25° C.

2. A phenolic resole as defined in claim 1 wherein the formaldehyde-to-phenol mole ratio at which the condensation reaction is affected is at least 1.9:1 and no more than about 2.2:1.

3. A phenolic resole as defined in claim 1 wherein the formaldehyde-to-phenol mole ratio at which the condensation reaction is effected is at least 1.7:1 and less than 1.9:1.

4. A phenolic resole as defined in claim 1 wherein the formaldehyde-to-phenol mole ratio at which the condensation reaction is effected is at least about 1.6:1 and less than 1.7:1.

5. A phenolic resole as defined in claim 1 in which the condensation reaction is effected in the presence of an alkali metal hydroxide as the condensation catalyst.

6. A phenolic resole as defined in claim 5 in which the condensation catalyst is sodium hydroxide.

7. A phenolic resole as defined in claim 5 in which the condensation catalyst is potassium hydroxide.

8. A phenolic resole as defined in claim 1 in which the condensation reaction is effected in the presence of an alkaline earth metal hydroxide as the condensation catalyst.

9. A phenolic resole as defined in claim 8 in which the condensation catalyst is barium hydroxide.

10. A phenolic resole capable of being foamed to a phenolic foam having a density from 1.90 to 3.70 pounds per cubic foot and, within said density range, a friability of less than 35 percent weight loss (after 10 minutes) and a compressive strength (parallel) of at least 20 pounds per square inch which resole has been produced by the base-catalyzed condensation of formaldehyde and phenol as the sole organic reactants fed to the condensation reaction, at a mole ratio of at least 1.9 and no more than about 2.2 moles of formaldehyde per mole of phenol, the aqueous alkaline condensate having been brought to a pH from about 5.0 to about 7.0 by the addition thereto of a salt-forming acidic compound, said resole being characterized by an average molecular weight such that a plot of log viscosity as a function of water content of the resole falls within the area defined by straight line interconnection in series of points (a)–(e) where points (a)–(e) are as follows:
  (a) a viscosity of about 50,000 centipoise at a water content of about 7.0 weight percent;
  (b) a viscosity of about 50,000 centipoise at a water content of about 9.5 weight percent;
  (c) a viscosity of about 26,000 centipoise at a water content of about 12.0 weight percent;
  (d) a viscosity of about 4,000 centipoise at a water content of about 12.0 weight percent; and
  (e) a viscosity of about 20,000 centipoise at a water content of about 7.0 weight percent; wherein the viscosity values are Brookfield at 25° C.

11. A phenolic resole capable of being foamed to a phenolic foam having a density from 1.90 to 3.70 pounds per cubic foot and, within said density range, a friability of less than 35 percent weight loss (after 10 minutes) and a compressive strength (parallel) of at least 20 pounds per square inch which resole has been produced by the base-catalyzed condensation of formaldehyde and phenol as the sole organic reactants fed to the condensation reaction, at a mole ratio of at least 1.7 and less than 1.9 moles of formaldehyde per mole of phenol, the aqueous alkaline condensate having been brought to a pH from about 5.0 to about 7.0 by the addition thereto of a salt-forming acidic compound, said resole being characterized by an average molecular weight such that a plot of log viscosity as a function of water content of the resole falls within the area defined by straight line interconnection in series of points (a)–(e) where points (a)–(e) are as follows:
  (a) a viscosity of about 50,000 centipoise at a water content of about 7.0 weight percent;
  (b) a viscosity of about 50,000 centipoise at a water content of about 9.5 weight percent;
  (c) a viscosity of about 25,000 centipoise at a water content of about 12.0 weight percent;
  (d) a viscosity of about 4,200 centipoise at a water content of about 12.0 weight percent; and
  (e) a viscosity of about 34,000 centipoise at a water content of about 7.0 weight percent;
wherein the viscosity values are Brookfield at 25° C.

12. In a process for producing phenol/formaldehyde resoles by the base-catalyzed condensation of phenol and formaldehyde and wherein the aqueous alkaline condensate is brought to a pH from about 5.0 to about 7.0 by the addition thereto of salt-forming acidic compound, the improvement which comprises introducing formaldehyde and phenol to the condensation reaction at a mole ratio of from about 1.6 to about 2.2 moles of formaldehyde per mole of phenol and effecting the condensation reaction under conditions such that a plot of log viscosity as a function of water content of the resole product falls within the area defined by straight line interconnection in series of points (i)–(iv) where points (i)–(iv) are as follows for the formaldehyde-to-phenol mole ratios indicated below:
  (a) at a formaldehyde-to-phenol mole ratio of at least 1.9:1 and no more than about 2.2:1, points (i)–(iv) are:
    (i) a viscosity of about 50,000 centipoise at a water content of about 1.7 weight percent;
    (ii) a viscosity of about 50,000 centipoise at a water content of about 9.5 weight percent;
    (iii) a viscosity of about 12,000 centipoise at a water content of about 15.0 weight percent; and
    (iv) a viscosity of about 1,000 centipoise at a water content of about 15.0 weight percent;
  (b) at a formaldehyde-to-phenol mole ratio of at least 1.7:1 and less than 1.9:1, points (i)–(iv) are:
    (i) a viscosity of about 50,000 centipoise at a water content of about 3.0 weight percent;
    (ii) a viscosity of about 50,000 centipoise at a water content of about 14.0 weight percent;
    (iii) a viscosity of about 25,000 centipoise at a water content of about 16.0 weight percent; and
    (iv) a viscosity of about 1,000 centipoise at a water content of about 16.0 weight percent;
  (c) at a formaldehyde-to-phenol mole ratio of at least about 1.6:1 and less than 1.7:1, points (i)–(iv) are:
    (i) a viscosity of about 50,000 centipoise at a water content of about 6.5 weight percent;
    (ii) a viscosity of about 50,000 centipoise at a water content of about 12.5 weight percent;
    (iii) a viscosity of about 25,000 centipoise at a water content of about 16.0 weight percent; and
    (iv) a viscosity of about 3,000 centipoise at a water content of about 16.0 weight percent;
wherein the said viscosity values are Brookfield at 25° C.

13. A process as defined in claim 12 in which the condensation reaction is effected in the presence of sodium hydroxide at a formaldehyde-to-phenol ratio of at least 1.9:1 and up to about 2.2:1.

* * * * *